US009535158B1

(12) United States Patent
Breiholz et al.

(10) Patent No.: US 9,535,158 B1
(45) Date of Patent: Jan. 3, 2017

(54) WEATHER RADAR SYSTEM AND METHOD WITH FUSION OF MULTIPLE WEATHER INFORMATION SOURCES

(71) Applicants: Arlen E. Breiholz, Cedar Rapids, IA (US); Kevin M. Kronfeld, Cedar Rapids, IA (US); Karen L. Walling, Cedar Rapids, IA (US); Robert J. McCabe, Swisher, IA (US)

(72) Inventors: Arlen E. Breiholz, Cedar Rapids, IA (US); Kevin M. Kronfeld, Cedar Rapids, IA (US); Karen L. Walling, Cedar Rapids, IA (US); Robert J. McCabe, Swisher, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 156 days.

(21) Appl. No.: 14/465,753

(22) Filed: Aug. 21, 2014

(51) Int. Cl.
G01S 13/95 (2006.01)
(52) U.S. Cl.
CPC .................... G01S 13/953 (2013.01)
(58) Field of Classification Search
CPC ............ G01C 23/00; G01S 13/95; G01S 7/04; G05D 1/0005; G05D 5/0008; G05D 5/0013; G05G 5/0021; G05G 5/0052; G05G 5/0091
USPC .......................................... 342/26, 175, 195
See application file for complete search history.

(56) References Cited

U.S. PATENT DOCUMENTS

| 650,275 A | 5/1900 | Reeve |
| 3,251,057 A | 5/1966 | Buehler et al. |
| 3,359,557 A | 12/1967 | Fow et al. |
| 3,404,396 A | 10/1968 | Buchler et al. |
| 3,465,339 A | 9/1969 | Marner |
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |

(Continued)

FOREIGN PATENT DOCUMENTS

| EP | 1 329 738 B1 | 7/2003 |
| FR | 2658617 A1 | 8/1991 |

(Continued)

OTHER PUBLICATIONS

U.S. Appl. No. 12/075,103, filed Mar. 7, 2008, Woodell et al.

(Continued)

Primary Examiner — Timothy A Brainard
(74) Attorney, Agent, or Firm — Donna P. Suchy; Daniel M. Barbieri

(57) ABSTRACT

A method of displaying an image representative of a weather condition near an aircraft includes receiving weather data representative of the weather condition from a plurality of weather data sources. The weather data includes location data for the weather condition. The method also includes mapping the weather data received from each source to a common locational reference frame based on the location data, adjusting the weather data received from each source to a common hazard scale, determining a hazard level associated with the weather condition for a reference point in the reference frame based on the adjusted weather data for each source, and displaying the image representative of the weather condition near the aircraft based on the hazard level for the reference point.

20 Claims, 12 Drawing Sheets

(56) References Cited

U.S. PATENT DOCUMENTS

| | | |
|---|---|---|
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,339,747 B1* | 1/2002 | Daly .................. G01W 1/10 702/3 |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1* | 6/2002 | Smith .................. G01S 13/951 702/4 |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1* | 7/2005 | Robinson .............. G01C 23/00 244/1 R |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |

(56) References Cited

U.S. PATENT DOCUMENTS

| | | |
|---|---|---|
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,205,928 B1 | 4/2007 | Sweet |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,586 B2 | 12/2007 | Peshlov et al. |
| 7,307,756 B2 | 12/2007 | Walmsley |
| 7,352,317 B1 | 4/2008 | Finley et al. |
| 7,352,929 B1 | 4/2008 | Hagen et al. |
| 7,365,674 B2 | 4/2008 | Tillotson et al. |
| 7,372,394 B1 | 5/2008 | Woodell et al. |
| 7,383,131 B1 | 6/2008 | Wey et al. |
| 7,417,579 B1 | 8/2008 | Woodell |
| 7,427,943 B1 | 9/2008 | Kronfeld et al. |
| 7,436,361 B1 | 10/2008 | Paulsen et al. |
| 7,471,995 B1 | 12/2008 | Robinson |
| 7,486,219 B1 | 2/2009 | Woodell et al. |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,664,601 B2 | 2/2010 | Daly, Jr. |
| 7,696,921 B1 | 4/2010 | Finley et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,917,255 B1 | 3/2011 | Finley |
| 7,932,853 B1 | 4/2011 | Woodell et al. |
| 7,973,698 B1 | 7/2011 | Woodell et al. |
| 7,982,658 B2 | 7/2011 | Kauffman et al. |
| 8,022,859 B2 | 9/2011 | Bunch et al. |
| 8,054,214 B2 | 11/2011 | Bunch |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,098,189 B1 | 1/2012 | Woodell et al. |
| 8,111,186 B2 | 2/2012 | Bunch et al. |
| 8,159,369 B1 * | 4/2012 | Koenigs ............... G01S 7/062 340/963 |
| 8,217,828 B2 | 7/2012 | Kirk |
| 8,228,227 B2 | 7/2012 | Bunch et al. |
| 8,314,730 B1 | 11/2012 | Musiak et al. |
| 8,332,084 B1 * | 12/2012 | Bailey ................. G01W 1/10 701/10 |
| 8,902,100 B1 | 12/2014 | Woodell et al. |
| 9,019,146 B1 | 4/2015 | Finley et al. |
| 2002/0039072 A1 | 4/2002 | Gremmert et al. |
| 2002/0126039 A1 * | 9/2002 | Dalton ................. G01S 13/951 342/26 R |
| 2003/0001770 A1 | 1/2003 | Cornell et al. |
| 2003/0025627 A1 | 2/2003 | Wilson et al. |
| 2003/0193411 A1 | 10/2003 | Price |
| 2004/0183695 A1 * | 9/2004 | Ruokangas ........... G01W 1/02 340/945 |
| 2004/0239550 A1 | 12/2004 | Daly, Jr. |
| 2005/0049789 A1 | 3/2005 | Kelly et al. |
| 2005/0174350 A1 | 8/2005 | Ridenour et al. |
| 2006/0036366 A1 | 2/2006 | Kelly et al. |
| 2007/0005249 A1 | 1/2007 | Dupree et al. |
| 2008/0158049 A1 | 7/2008 | Southard et al. |
| 2009/0177343 A1 | 7/2009 | Bunch et al. |
| 2009/0219197 A1 | 9/2009 | Bunch |
| 2010/0019938 A1 | 1/2010 | Bunch |
| 2010/0042275 A1 | 2/2010 | Kirk |
| 2010/0194628 A1 | 8/2010 | Christianson et al. |
| 2010/0201565 A1 | 8/2010 | Khatwa |
| 2010/0245164 A1 | 9/2010 | Kauffman |
| 2010/0302094 A1 * | 12/2010 | Bunch ................. G01S 13/956 342/26 D |
| 2011/0074624 A1 | 3/2011 | Bunch |
| 2011/0148692 A1 | 6/2011 | Christianson |
| 2011/0148694 A1 | 6/2011 | Bunch et al. |
| 2012/0029786 A1 | 2/2012 | Calandra et al. |
| 2012/0133551 A1 | 5/2012 | Pujol et al. |
| 2012/0139778 A1 | 6/2012 | Bunch et al. |
| 2013/0226452 A1 | 8/2013 | Watts |
| 2013/0234884 A1 | 9/2013 | Bunch et al. |
| 2014/0176362 A1 | 6/2014 | Sneed |
| 2014/0362088 A1 | 12/2014 | Veillette et al. |

FOREIGN PATENT DOCUMENTS

| | | |
|---|---|---|
| WO | WO-98/07047 A1 | 2/1998 |
| WO | WO-98/22834 | 5/1998 |
| WO | WO-03/005060 | 1/2003 |
| WO | WO-2009/137158 | 11/2009 |

OTHER PUBLICATIONS

U.S. Appl. No. 13/841,893, filed Mar. 15, 2013, Rockwell Collins, Inc.

U.S. Appl. No. 13/919,406, filed Jun. 17, 2013, Rockwell Collins, Inc.

U.S. Appl. No. 14/086,844, filed Nov. 21, 2013, Rockwell Collins, Inc.

U.S. Appl. No. 14/206,239, filed Mar. 12, 2014, Rockwell Collins.

U.S. Appl. No. 14/206,651, filed Mar. 12, 2014, Rockwell Collins, Inc.

U.S. Appl. No. 14/207,034, filed Mar. 12, 2014, Rockwell Collins, Inc.

3-D Weather Hazard and Avoidance System, Honeywell InteVue Brochure dated Nov. 2008, 4 pages.

Bovith et al., Detecting Weather Radar Clutter by Information Fusion with Satellite Images and Numerical Weather Prediction Model Output; Jul. 31-Aug. 4, 2006, 4 pages.

Burnham et al., Thunderstorm Turbulence and Its Relationship to Weather Radar Echoes, J. Aircraft, Sep.-Oct. 1969, 8 pages.

Corridor Integrated Weather System (CIWS), www.II.mit.edu/mission/aviation/faawxsystems/ciws.html, received on Aug. 19, 2009, 3 pages.

Doviak et al., Doppler Radar and Weather Observations, 1984, 298 pages.

Dupree et al., FAA Tactical Weather Forecasting in the United States National Airspace, 29 pages.

Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.

Greene et al., Vertically Integrated Liquid Water—A New Analysis Tool, Monthly Weather Review, Jul. 1972, 5 pages.

Hodanish, Integration of Lightning Detection Systems in a Modernized National Weather Service Office, http://www.srh.noaa.gov/mlb/hoepub.html, retrieved on Aug. 6, 2007, 5 pages.

Honeywell, RDR-4B Forward Looking Windshear Detection/Weather Radar System User's Manual with Radar Operation Guidelines, Jul. 2003.

Keith, Transport Category Airplane Electronic Display Systems, Jul. 16, 1987, 34 pages.

(56) References Cited

OTHER PUBLICATIONS

Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Pessi et al., On the Relationship Between Lightning and Convective Rainfall Over the Central Pacific Ocean, date unknown, 9 pages.
RDR-4B Honeywell User Manual for Forward Looking Windshear Detection/Weather Radar System, Rev. 6, Jul. 2003, 106 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.
Decision on Appeal for Inter Parties Reexamination Control No. 95/001,860, dated Oct. 17, 2014, 17 pages.
Final Office Action on U.S. Appl. No. 12,892,663 dated Mar. 7, 2013, 13 pages.
Final Office Action on U.S. Appl. No. 13/238,606 Dated Apr. 1, 2014, 11 pages.
Final Office Action on U.S. Appl. No. 13/238,606 Dated Jan. 22, 2015, 6 pages.
Final Office Action on U.S. Appl. No. 13/246,769 Dated Sep. 16, 2014, 18 pages.
Non-Final Office Action on U.S. Appl. No. 12/892,663 Dated May 29, 2013, 14 pages.
Non-Final Office Action on U.S. Appl. No. 13/238,606 Dated Jul. 8, 2014, 12 pages.
Non-Final Office Action on U.S. Appl. No. 13/238,606 Dated Sep. 23, 2013, 15 pages.
Non-Final Office Action on U.S. Appl. No. 13/717,052 Dated Sep. 9, 2014, 8 pages.
Notice of Allowance on U.S. Appl. No. 12/075,103 Dated Aug. 4, 2014, 10 pages.
Notice of Allowance on U.S. Appl. No. 13/246,769 Dated Jan. 8, 2015, 10 pages.
Office Action for U.S. Appl. No. 12/892,663, mail date Oct. 22, 2012, 12 pages.
Office Action for U.S. Appl. No. 13/717,052, mail date Aug. 22, 2013, 15 pages.
Office Action on U.S. Appl. No. 12/075,103 Dated Jul. 31, 2013, 8 pages.
Office Action on U.S. Appl. No. 13/246,769 Dated Apr. 21, 2014, 18 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
U.S. Appl. No. 13/246,769, filed Sep. 27, 2011, Rockwell Collins.
U.S. Appl. No. 13/717,052, filed Dec. 17, 2012, Dwoodell et al.
U.S. Appl. No. 13/717,052, filed Dec. 17, 2012, Woodell et al.
U.S. Appl. No. 13/837,538, filed Mar. 15, 2013, Kronfeld et al.
U.S. Appl. No. 14/162,035, filed Jan. 23, 2014, Kronfeld et al.
U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/608,071, filed Jan. 28, 2015, Breiholz et al.
Boudevillain et al., 2003, Assessment of Vertically Integrated Liquid (VIL) Water Content Radar Measurement, J. Atmos. Oceanic Technol., 20, 807-819.
Greene et al., 1972, Vertically Integrated Water—A New Analysis Tool, Mon. Wea. Rev., 100, 548-552.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Non-Final Office Action on U.S. Appl. No. 13/238,606 Dated May 27, 2015, 14 pages.
Non-Final Office Action on U.S. Appl. No. 14/452,235 Dated Apr. 23, 2015, 9 pages.
Non-Final Office Action on U.S. Appl. No. 14/681,901 Dated Jun. 17, 2015, 21 pages.
Non-Final Office Action on U.S. Appl. No. 13/238,606 Dated Mar. 27, 2015, 21 pages.
Non-Final Office Action on U.S. Appl. No. 13/717,052 Dated Feb. 11, 2015, 15 pages.
Non-Final Office Action on U.S. Appl. No. 13/841,893 Dated Jun. 22, 2015, 27 pages.
Non-Final Office Action on U.S. Appl. No. 13/913,100 Dated May 4, 2015, 25 pages.
Non-Final Office Action on U.S. Appl. No. 13/919,406 Dated Jul. 14, 2015, 23 pages.
Non-Final Office Action on U.S. Appl. No. 14/162,035, dated Feb. 4, 2016, 9 pages.
Non-Final Office Action on U.S. Appl. No. 14/086,844, dated Nov. 10, 2015, 17 pages.
Notice of Allowance on U.S. Appl. No. 13/707,438 Dated Feb. 25, 2015, 11 pages.
Notice of Allowance on U.S. Appl. No. 14/681,901, dated Dec. 23, 2015, 8 pages.
Zipser, Edward J. et al., The Vertical Profile of Radar Reflectivity of Convective Cells: A Strong Indicator of Storm Intensity and Lightning Probability?, American Meteorological Society, Aug. 1994, 9 pages.
Corrected Notice of Allowability on U.S. Appl. No. 14/086,844, dated Sep. 26, 2016, 2 pages.
Non-Final Office Action on U.S. Appl. No. 14/162,035 dated Jul. 11, 2016, 10 pages.

* cited by examiner

| Rainfall Rate Stratiform (in/hr) | Rainfall Rate Convective (in/hr) | dBz | VIL (kg/m²) | Lightning Rate (/10 min) | VIP |
|---|---|---|---|---|---|
| 0.00 | < 0.05 | <17 | <0.140 | | 0 |
| 0.00 – 0.13 | 0.05 – 0.27 | 18 - 29 | 0.140 – 0.699 | | 1 |
| 0.14 – 0.50 | 0.28 – 1.10 | 30 - 39 | 0.700 – 3.0 | | 2 |
| 0.60 – 1.0 | 1.32 – 2.20 | 40 - 44 | 3.5 – 6.899 | 3 - 5 | 3 |
| | 2.78 - 4.50 | 45 - 49 | 6.9 – 11.99 | 6 - 14 | 4 |
| | 4.87 - 7.10 | 50 - 56 | 12.0 - 28 | ≥ 15 | 5 |
| | >7.1 | ≥ 57 | ≥ 32 | ≥ 15 | 6 |

FIG. 10

WEATHER RADAR SYSTEM AND METHOD WITH FUSION OF MULTIPLE WEATHER INFORMATION SOURCES

CROSS-REFERENCE TO RELATED PATENT APPLICATIONS

The present application is related to U.S. patent application Ser. No. 14/162,035 filed on Jan. 23, 2014 by Kronfeld et al., entitled "Weather Radar System and Method With Path Attenuation Shadowing," U.S. patent application Ser. No. 14/086,844 filed on Nov. 21, 2013 by Breiholz et al., entitled "Weather Radar System and Method for Estimating Vertically Integrated Liquid Content," and to U.S. patent application Ser. No. 14/465,730 filed on Aug. 21, 2014 by Breiholz et al., entitled "Weather Radar System and Method With Latency Compensation for Data Link Weather Information," each of which is assigned to the assignee of the present application and incorporated herein by reference in its entirety.

BACKGROUND

The present disclosure relates generally to the field of weather display systems. More particularly, the present disclosure relates to a weather display system and method configured to provide latency compensation for data linked weather data.

Aircraft weather radar systems are often used to alert operators of vehicles, such as aircraft pilots, of weather hazards in the area near the aircraft. Such weather radar systems typically include an antenna, a receiver transmitter, a processor, and a display. The system transmits radar pulses or beams and receives radar return signals indicative of weather conditions. Conventional weather radar systems, such as the WXR 2100 MULTISCAN radar system manufactured by Rockwell Collins, Inc., have Doppler capabilities and can measure or detect parameters such as weather range, weather reflectivity, weather velocity, and weather spectral width or velocity variation. Weather radar systems may also detect outside air temperature, winds at altitude, INS G loads (in-situ turbulence), barometric pressure, humidity, etc.

Weather radar signals are processed to provide graphical images to a radar display. The radar display is typically a color display providing graphical images in color to represent the severity of the weather. Some aircraft systems also include other hazard warning systems such as a turbulence detection system. The turbulence detection system can provide indications of the presence of turbulence or other hazards. Conventional weather display systems are configured to display weather data in two dimensions and often operate according to ARINC 453 and 708 standards. A horizontal plan view provides an overview of weather patterns that may affect an aircraft mapped onto a horizontal plane. Generally the horizontal plan view provides images of weather conditions in the vicinity of the aircraft, such as indications of precipitation rates. Red, yellow, and green colors are typically used to symbolize areas of respective precipitation rates, and black color symbolizes areas of very little or no precipitation. Each color is associated with radar reflectivity range which corresponds to a respective precipitation rate range. Red indicates the highest rates of precipitation while green represents the lowest (non-zero) rates of precipitation. Certain displays may also utilize a magenta color to indicate regions of turbulence.

While aircraft-based weather radar systems may typically provide the most timely and directly relevant weather information to the aircraft crew based on scan time of a few seconds, the performance of aircraft-based weather radar systems may be limited in several ways. First, typical radar beam widths of aircraft-based weather radar systems are 3 to 10 degrees. Additionally, the range of aircraft-based weather radar systems is typically limited to about 300 nautical miles, and typically most effective within about 80-100 nautical miles. Further, aircraft-based weather radar systems may be subject to ground clutter when the radar beam intersects with terrain, or to path attenuation due to intense precipitation or rainfall.

Information provided by aircraft weather radar systems may be used in conjunction with weather information from other aircraft or ground-based systems to, for example, improve range and accuracy and to reduce gaps in radar coverage. For example, the National Weather Service WSR-88D Next Generation Radar (NEXRAD) weather radar system is conventionally used for detection and warning of severe weather conditions in the United States. NEXRAD data is typically more complete than data from aircraft-based weather radar systems due to its use of volume scans of up to 14 different elevation angles with a one degree beam width. Similarly, the National Lightning Detection Network (NLDN) may typically be a reliable source of information for weather conditions exhibiting intense convection. Weather satellite systems, such as the Geostationary Operational Environmental Satellite system (GOES) and Polar Operational Environmental Satellite system (POES) are other sources of data used for weather analyses and forecasts.

While NEXRAD has provided significant advancements in the detection and forecasting of weather, NEXRAD data may have gaps where no data is collected (e.g., due to cone of silence and umbrella of silence regions, insufficient update rates, geographic limitations, or terrain obstructions). Similarly, weather observations and ground infrastructure are conventionally limited over oceans and less-developed land regions. Providing weather radar information from aircraft systems to other aircraft systems and/or ground-based operations may provide significant improvement to weather observations and forecasts by filling such gaps in radar coverage. Similarly, providing weather radar information from ground-based systems to aircraft-based systems may increase the range and accuracy of aircraft-based systems in certain conditions.

One issue with sharing weather data among aircraft-based and ground-based weather radar systems is the discrepancy in apparent location of weather conditions due to the time delay associated with transmitting and displaying shared weather data. For example, depending on circumstances, latencies associated with transmission and delivery of uplinked weather radar data from a ground-based system to an aircraft-based system are commonly on the order of 5-10 minutes, and in some cases may be as long as 20 minutes. Ground-based weather radar systems may also have a lower update rate. Such latency issues have conventionally limited the use of uplinked weather radar data to longer range applications rather than shorter range tactical decisions.

Such latency issues are further compounded when multiple weather radar data sources are combined. Current systems typically provide individual displays for each data source, and often with display limitations that require the aircraft crew to form a mental image of an integrated display rather than actually viewing an integrated display. Furthermore, misalignments due to latency issues may result in increasing the size of threat regions such that longer diversions are required for an aircraft to avoid such enlarged threat regions. In addition, the various sensors used by each of the multiple weather data sources may provide dissimilar measurements for a weather condition, creating uncertainty in how to weight the data provided from each source. There is an ongoing need for improved weather radar systems and methods that provide a comprehensive integrated display of weather conditions using multiple weather radar data sources. There is yet further need for improved weather radar systems and methods that compensate for latency issues associated with sharing and fusing weather radar data among aircraft-based and ground-based systems to more accurately portray the threat posed by a weather condition. There is further need for improved weather radar systems and methods that provide a confidence factor reflecting the degree to which various input sources agree in their characterization of the severity of the threat posed by a weather condition. There is further need for improved weather radar systems and methods that provide a composite estimate of storm top height to provide a more accurate picture of the vertical extent of the threat posed by a weather condition.

SUMMARY

According to an exemplary embodiment, a method of displaying an image representative of a weather condition near an aircraft includes receiving weather data representative of the weather condition from a plurality of weather data sources. The weather data includes location data for the weather condition. The method also includes mapping the weather data received from each source to a common locational reference frame based on the location data, adjusting the weather data received from each source to a common hazard scale, determining a hazard level associated with the weather condition for a reference point in the reference frame based on the adjusted weather data for each source, and displaying the image representative of the weather condition near the aircraft based on the hazard level for the reference point According to another exemplary embodiment, an aircraft weather radar system includes a processor and a non-transitory memory coupled to the processor. The memory contains program instructions that, when executed, cause the processor to receive weather data representative of a weather condition from a plurality of weather data sources. The weather data includes location data for the weather condition. The instructions further cause the processor to map the weather data received from each source to a common locational reference frame based on the location data, determine a hazard level associated with the weather condition for a reference point in the reference frame based on the adjusted weather data for each source, evaluate a confidence level for the hazard level at the reference point, and display an image representative of the weather condition near the aircraft based on the confidence level for the hazard level at the reference point.

According to another exemplary embodiment, a weather radar system includes a processor and a non-transitory memory coupled to the processor. The memory contains program instructions that, when executed, cause the processor to receive echo top data for a weather condition from first and second weather data sources, map the echo top data to a common reference frame, adjust the echo top data received from the first source based on the echo top data received from the second source, and generate an image representative of the weather condition based on the adjusted echo top data.

BRIEF DESCRIPTION OF THE DRAWINGS

The disclosure will become more fully understood from the following detailed description, taken in conjunction with the accompanying figures, wherein like reference numerals refer to like elements, in which:

FIG. 10 is an exemplary translation chart of selected parameters to the VIP hazard scale.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of display devices for various types of applications or sensing systems. In some embodiments, the systems and methods of the present disclosure may be used for a flight display of an aircraft. According to various other exemplary embodiments, the systems and methods of the present disclosure may be used by any system in any other embodiment for rendering computer graphics and displaying an output (e.g., in another aircraft or spacecraft, a ground-based vehicle, or in a non-vehicle application such as a ground-based weather radar system.

Figure 1A:
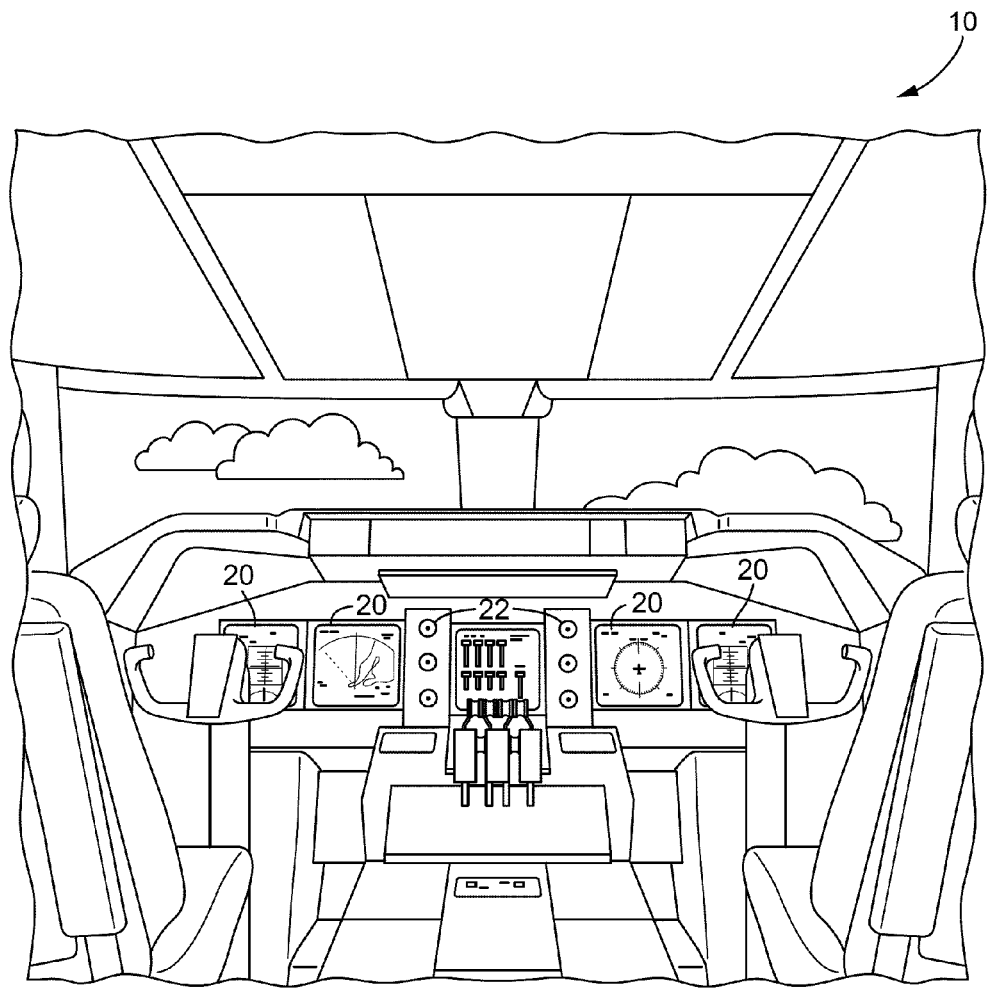
FIG. 1A is a perspective view schematic of an exemplary aircraft control center or cockpit.

Referring to FIG. 1A, an exemplary aircraft control center or cockpit 10 for an aircraft is shown. Aircraft control center 10 may include one or more flight displays 20. Flight displays 20 may be implemented using any of a variety of display technologies, including CRT, LCD, organic LED, dot matrix display, and others. Flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, Google glasses, etc. Flight displays 20 may be used to provide information to the flight crew, thereby increasing visual range and enhancing decision-making abilities. One more flight displays 20 may be configured to function as, for example, a primary flight display (PFD) used to display altitude, airspeed, vertical speed, navigation and traffic collision avoidance system (TCAS) advisories. One or more flight displays 20 may also be configured to function as, for example, a multi-function display used to display navigation maps, weather radar, electronic charts, TCAS traffic, aircraft maintenance data and electronic checklists, manuals, and procedures. One or more flight displays 20 may also be configured to function as, for example, an engine indicating and crew-alerting system (EICAS) display 110c used to display critical engine and system status data. Other types and functions flight displays 20 are contemplated as well. According to various exemplary embodiments, at least one of flight displays 20 may be configured to provide a rendered display from the systems and methods of the present disclosure.

In some embodiments, flight displays 20 may provide an output from an aircraft-based weather radar system, LIDAR system, infrared system or other system on the aircraft. For example, flight displays 20 may include a weather display, a joint display, a weather radar map and a terrain display. Further, flight displays 20 may include an electronic display or a synthetic vision system (SVS). For example, flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view, etc.). The views may include monochrome or color graphical representations of the terrain and/or weather information. Graphical representations of weather or terrain may include an indication of altitude of the weather or terrain or the altitude relative to the aircraft.

Aircraft control center 10 may include one or more user interface (UI) elements 22. UI elements 22 may include, for example, dials, switches, buttons, touch screens, keyboards, a mouse, joysticks, cursor control devices (CCDs) or other multi-function key pads certified for use with avionics systems, etc. UI elements 22 may be configured to, for example, allow an aircraft crew member to interact with various avionics applications and perform functions such as data entry, manipulation of navigation maps, and moving among and selecting checklist items. For example, UI elements 22 may be used to adjust features of flight displays 20, such as contrast, brightness, width, and length. UI elements 22 may also (or alternatively) be used by an occupant to interface with or change the displays of flight displays 20. UI elements 22 may additionally be used to acknowledge or dismiss an indicator provided by flight displays 20. Further, UI elements 22 may be used to correct errors on the electronic display. Other UI elements 22, such as indicator lights, displays, display elements, and audio alerting devices, may be configured to warn of potentially threatening conditions such as severe weather, terrain, obstacles, etc.

Figure 1B:
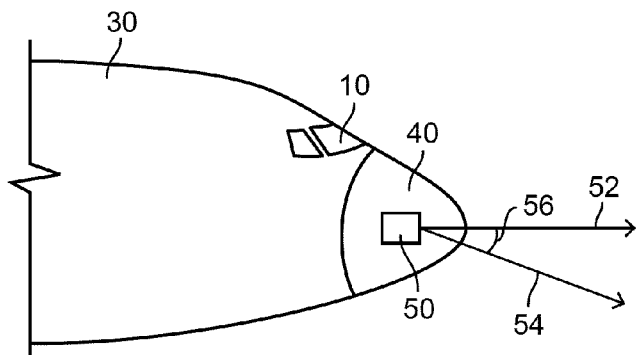
FIG. 1B is a side view schematic illustration of the front of an exemplary aircraft with an aircraft control center and nose.

Referring to FIG. 1B, a side-view of an exemplary aircraft 30 with aircraft control center 10 and a nose 40 is shown. In the illustrated embodiment, a radar system 50, such as a weather radar system or other radar system, is generally located inside nose 40 of aircraft 30 or inside a cockpit of aircraft 30. According to other exemplary embodiments, radar system 50 may be located anywhere on aircraft 30, such as on the top of aircraft 30 or on the tail of aircraft 30. Furthermore, the various components of radar system 50 may be distributed at multiple locations throughout aircraft 30. Additionally, radar system 50 may include or be coupled to an antenna system of aircraft 30. Radar system 50 or other equipment aboard aircraft 30 may also be configured to receive weather data from other sources. Radar system 50 may be configured to detect or receive data for the systems and methods of the present disclosure. According to exemplary embodiments, radar system 50 may be an RTA-4218 MULTISCAN radar system, a WXR-2100 MULTISCAN radar system, or similar system manufactured by Rockwell Collins Inc., and configured in accordance with the principles described herein.

Radar system 50 may generally work by sweeping a radar beam horizontally back and forth across the sky. For example, radar system 50 may conduct a first horizontal sweep 52 directly in front of the aircraft and a second horizontal sweep 54 downward at a tilt angle 56 (e.g., 20 degrees down). Returns from different tilt angles may be electronically merged to form a composite image for display on an electronic display, such as flight display 20 in aircraft control center 10. Returns may also be processed to, for example, distinguish among terrain, weather, and other objects, to determine the height of the terrain, to determine the height of the weather, etc.

Radar system 50 may also sweep a radar beam vertically back and forth at varying vertical tilt angles. Results from the different vertical tilt angles may be analyzed to determine the characteristics of weather. For example, the altitude, range, and vertical height of weather may be determined using the vertical scan results. The vertical scan results may be used to form an image for display on an electronic display (e.g., flight display 20, etc.). For example, a vertical profile view of the weather may be generated. The profile may be used by a pilot to determine height, range, hazards and threats, and other relevant information that may be utilized by an aircraft crew member to change the course of the aircraft to avoid the detected weather condition.

Figure 2:
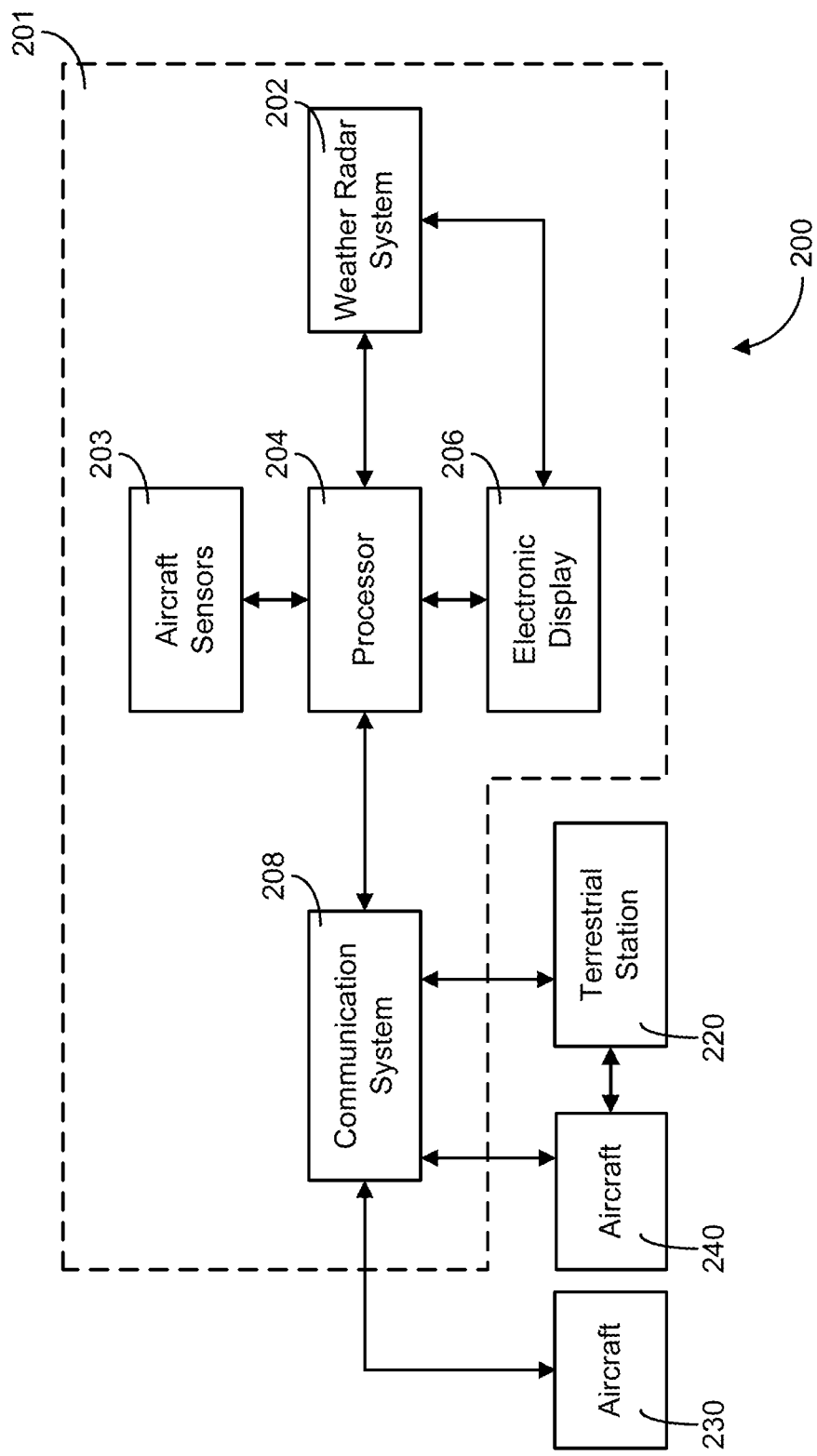
FIG. 2 is a more detailed block diagram of the exemplary weather radar system of FIG. 1.

Referring to FIG. 2, a block diagram of an exemplary weather detection system 200 that may be used, for example, on an aircraft 201 or other vehicle is shown. System 200 may include a weather radar system 202 (e.g., a system similar to radar system 50), aircraft sensors 203, electronics (such as a processor 204), an electronic display system 206 (e.g., a display similar to flight display 20), and a communication system 208. Weather radar system 202 is generally configured to cast one or more radar beams from an aircraft mounted antenna, to receive returns, and to interpret the returns (e.g. for display to a user, for transmission to an external weather system, etc.).

Additionally, weather radar system 202 may perform multiple radar sweeps. The radar sweeps may include horizontal sweeps, vertical sweeps, or a combination of horizontal and vertical sweeps. Further, the radar sweeps can be performed such that they are substantially orthogonal to one another. According to other exemplary embodiments, weather radar system 202 can be a monopulse radar system, a sequential lobing system, or a radar system with an aperture capable of switching modes. Aircraft sensors 203 may include, for example, one or more lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, or any other aircraft sensors or sensing systems that may be used to monitor weather and detect, for example, lightning, convective cells, clear air turbulence, etc. Data from aircraft sensors 203 may be output to processor 204 for further processing and display, or for transmission to a station 220 (e.g., a ground-based weather radar system or terrestrial station) or to other aircraft 230, 240 via communication system 208.

Weather radar system 202 may be a system for detecting weather patterns. Detected weather patterns may be communicated to electronic display system 206 for display to the flight crew. In addition, data from station 220 may be displayed on display system 206. Detected weather patterns may instead or may also be provided to electronics or processor 204 for further analysis or transmission to a station 220 or another aircraft 230, 240 via communication system 208.

Station 220 may direct the aircraft 201, 230, 240 via communication system 208 to scan in specific areas to improve detection accuracy of weather. Alternatively, system 202 may request that station 220 and aircraft 230, 240 direct a scan towards weather of interest to aircraft 201 (e.g., in the flight path) to improve weather detection accuracy. The scans performed by radar system 202 and the requests may be transmitted to station 220 or another aircraft 230, 240 via communication system 208.

Figure 3:
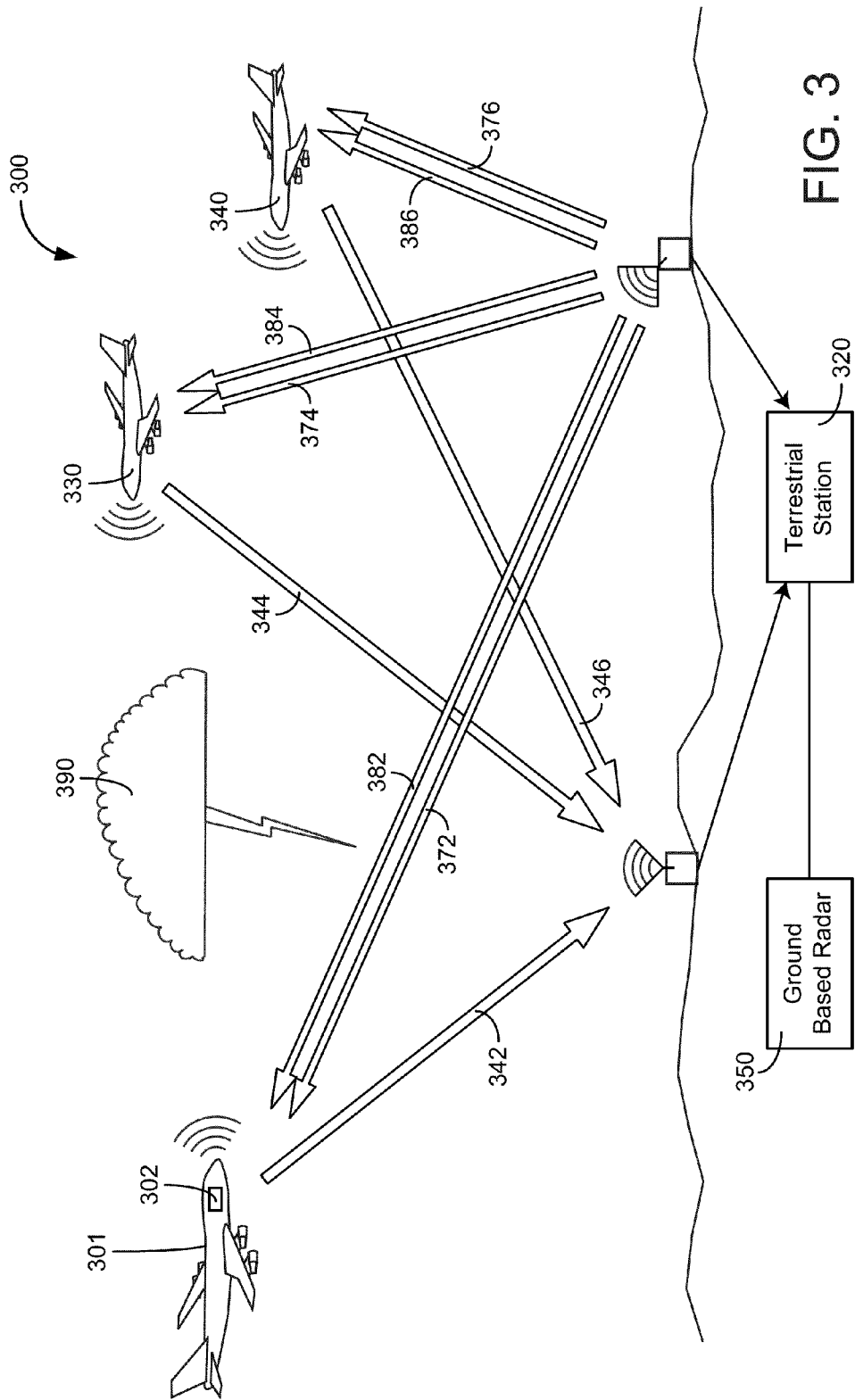
FIG. 3 is a diagram of an exemplary aircraft communications system.

Referring to FIG. 3, an exemplary aircraft communications system 300 is shown. System 300 may facilitate communications among an aircraft 301 having weather radar system 302 aboard, a ground-based data center or terrestrial station 320 and other aircraft, such as an aircraft 330 and an aircraft 340. Station 320 may receive weather data via a channel 342 from aircraft 301, via a channel 344 from aircraft 330, and via a channel 346 from aircraft 340. System 300 may utilize data and communications from more than three aircraft even though only three aircraft are shown in FIG. 3. Additional data may be received from ground based radar 350 from a wireless or wired channel. Station 320 may provide data to aircraft 301 via a channel 372, to aircraft 330 via channel 374, and to aircraft 340 via channel 376. Station 320 may also provide scheduling data and other control data to aircraft 301 via a channel 382, to aircraft 330 via a channel 384, and to aircraft 340 via a channel 386.

Various types of channels may be utilized including virtual channels, radio channels, satellite channels, etc. The channels may be bi-directional or uni-directional. Channels may be satellite link channels, VHF channels, INMARSAT channels, etc. Any type of wireless communications may be utilized. Various types of communication protocols, including network and ad hoc network protocols may be used to perform communication operations and establish the channels in FIG. 3.

The weather data exchanged among ground station 320 and aircraft 301, 330, and 340 may be in a number of forms. For example, the weather data may include radar data containing location information, motion vector data, time of sensing information, and measured parameter values for a weather condition 390. The location information may be in, for example, a format based on azimuth, elevation, and range from the radar system or another fixed reference point, in a rectangular grid format, a georegistered format, or other format. The radar data may also include radar characteristics associated with the radar used to provide the radar data. The characteristics may include an indication of band-type, radar quality, tilt angle, etc. In some embodiments, station 320 may adjust radar for its particular bands so that comparisons and selection of data is consistent.

In some embodiments, the weather data may be provided from a plurality of sources. Such weather data may also be indicative of one or more types of weather conditions. For example, weather data may be indicative of convective weather systems (e.g., thunderstorms), turbulence, winds aloft, icing, and/or volcanic ash. In some embodiments, data regarding convective weather systems may be provided from a ground-based weather system such as NEXRAD. Such data may include IDs for an adaptable number of weather cells, which may be segmented (e.g., delivered in polygon format) weather cells identified in a series of radar volume scans. Individual weather cells may be, for example, 3-D regions of significant reflectivity or other values above one or more specified threshold values. Individual weather cells may be composed of reflectivity radial run segments, and in turn, 2-D weather components composed of segment groups and occurring at different radar elevation angles. Weather components with calculated mass weighted centroids may be vertically correlated into a cell with an established centroid. Such weather cell data may also include individual data points and trends for each weather cell. For example, current weather cell location may be provided with azimuth, range, direction, and speed information, such as a motion vector using polar and/or Cartesian coordinates along with an estimate of any tracking errors. Other examples include storm base height, storm top height, maximum reflectivity, height of maximum reflectivity, probability of hail, probability of severe hail, cell-based vertically integrated liquid (VIL) content, enhanced echo tops (EET) and centroid height. Weather tracking data may be generated by monitoring movement of weather cells and matching cells in current and prior volume scans. Forecast data may be generated by predicting future centroid locations based on prior volume scans, and growth, decay, and/or shape change estimates. Average data for multiple weather cells may be provided as well (e.g., average motion vector data). The weather data may be provided as, for example, a table of alphanumeric values, and/or as a stand-alone display or graphical overlay.

In some embodiments, weather data indicative of weather conditions exhibiting intense convection may include lightning data such as that provided by the NLDN. Such data may include indications of individual discharges or flash rates in a given area. In some embodiments, pilot reports (PIREPs) may be used to indicate turbulence. In some embodiments, observation, nowcast and/or forecast data from weather satellite systems, such as the Geostationary Operational Environmental Satellite system (GOES) and Polar Operational Environmental Satellite system (POES) may also be used (e.g., to track volcanic ash cloud behavior). In some embodiments, radiosonde data from weather balloons may be used. In some embodiments, data from satellite sources or nowcasting weather data sources (e.g., the Corridor Integrated Weather System (CIWS)) may be used.

Figure 4A:
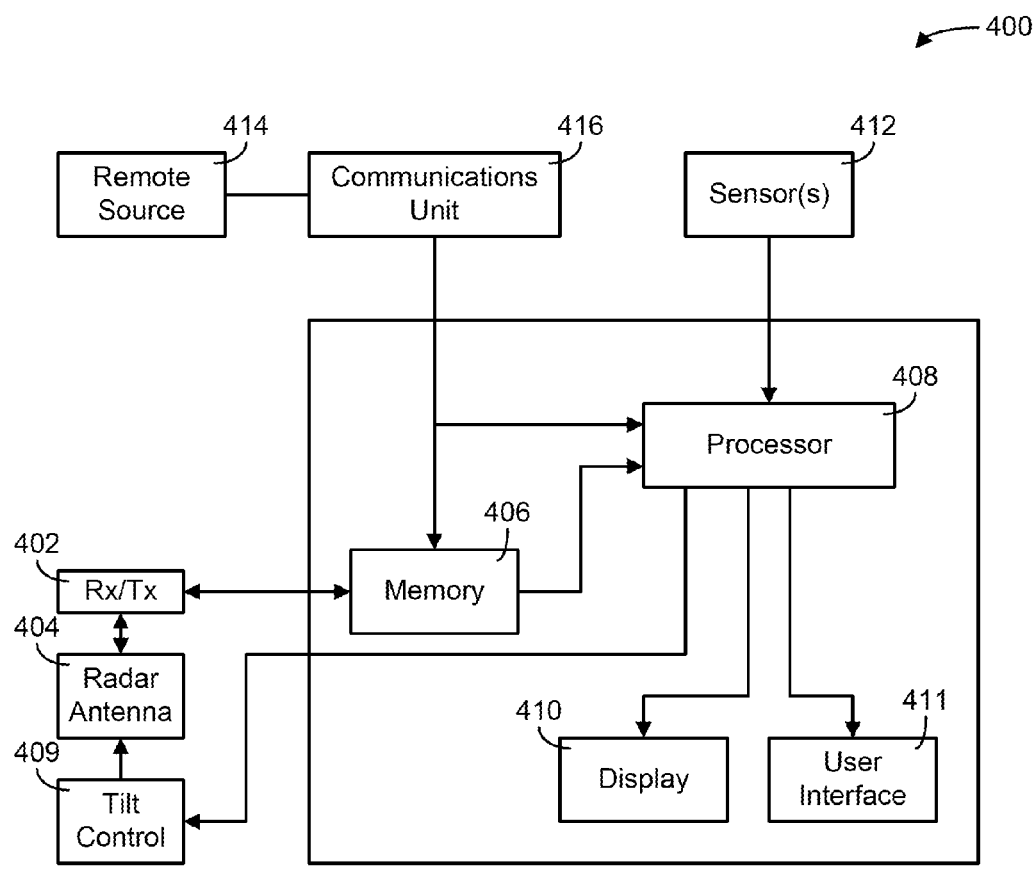
FIG. 4A is a block diagram of an exemplary weather radar system.

Referring to FIG. 4A, an exemplary weather radar system 400 is shown. System 400 may include a weather radar receiver/transmitter 402, weather radar adjustable antenna 404, a memory 406 (e.g., a multi-scan, multi-tilt angle memory), a processor 408 and a system bus that couples various system components including memory 406 to processor 408. System 400 may also include a tilt control 409 for automatically controlling the tilt angle (mechanical or electronic) of antenna 404. In some embodiments, this auto control may include an additional manual control feature as well. System 400 may also be in communication with one or more displays 410 (e.g., a display similar to display 20 shown in FIG. 1), one or more UI elements 411 (e.g., similar to UI elements 22 shown in FIG. 1) and one or more sensors 412, and also in communication with one or more remote data sources 414 (e.g., another aircraft or a ground station) via a communications unit 416 (e.g., radio or other wireless communication device).

Figure 4B:
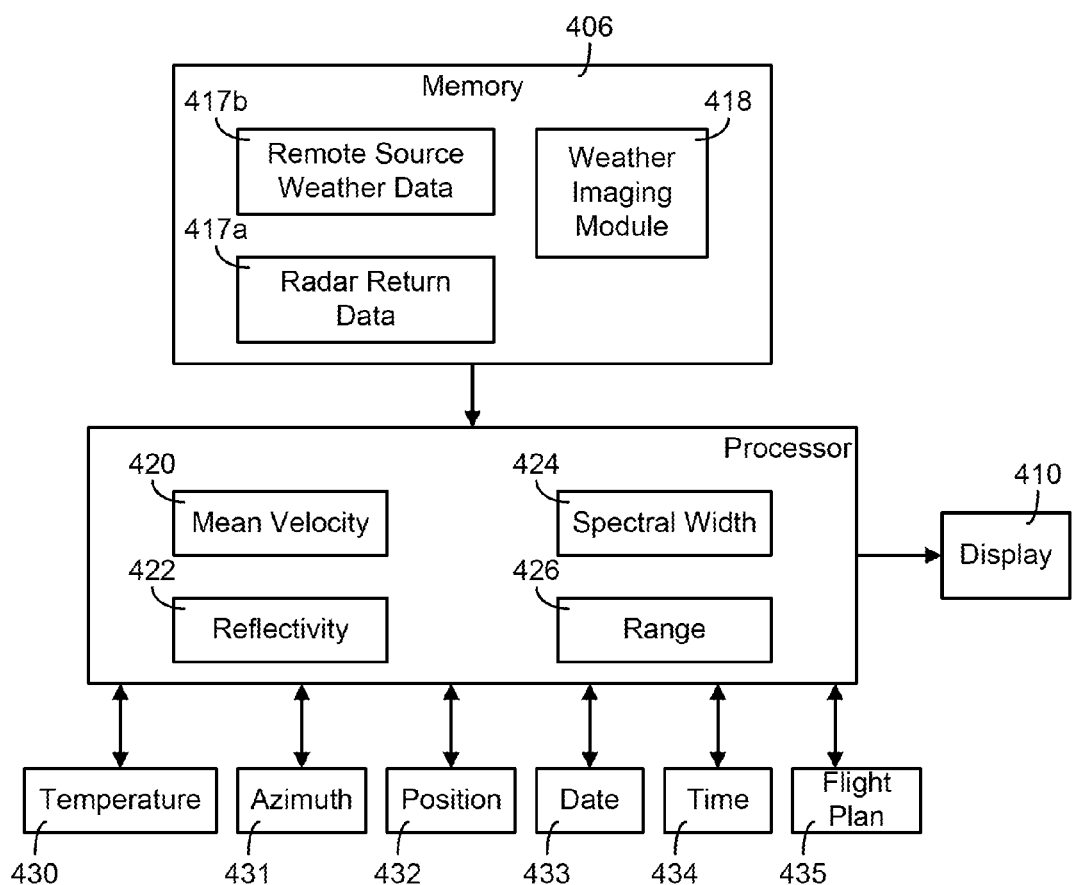
FIG. 4B is a data flow diagram of an exemplary weather radar system.

Memory 406 may include any type of machine-readable storage device capable of storing radar returns or associated weather data 417 (shown in FIG. 4B) or program instructions for analysis/processing by processor 408, such as weather image application 418 (shown in FIG. 4B). Memory 406 may be, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise random access memory (RAM), read only memory (ROM), erasable programmable read only memory (EPROM), electrically erasable programmable memory (EEPROM), CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine. System 400 may have one or more memories 406 that use the same or a different memory technology. Memory 406 may store weather data 417 and weather image application 418 in addition to other instructions or data.

In some embodiments, memory 406 may store in a readily addressable and rapidly retrievable manner at least two sets of weather data 417 resulting from two or more antenna or radar beam sweeps at different angles or tilt angles. Although a multi-scan, multi-tilt scanning and data sets are described, it should be understood by one of ordinary skill in the art that a single scan of data may also be used in some embodiments. Memory 406 may also include a three-dimensional storage buffer for storing weather radar parameters according to X, Y and Z coordinates according to one embodiment. The storage of radar data and the form of the weather data 417 stored in the memory 406 is not disclosed in a limiting fashion. A variety of techniques for storing weather data 417 may be used as well.

In some embodiments, weather data 417 may be stored (e.g., in the memory 406) as a mathematical equation representation of the information. The mathematical equation representation may be a piecewise linear function, piecewise nonlinear function, coefficients of a cubic spline, coefficients of a polynomial function, etc., that represent vertical representations of a weather condition based on the horizontal scan data and/or horizontal representation of the weather condition based on the vertical scan data. The function may be an equation based on weather parameters that may be sensor driven, model driven, a merger of sensor and model, etc. Although horizontal scan data is described, alternative embodiments may include Cartesian coordinates, rho/theta input, latitude and longitude coordinates, altitude, etc. Weather conditions may be estimated for any desired point in space with the vertical dimension being the subject of the weather equation.

Processor 408 may be implemented in hardware, firmware, software, or any combination of these methods. System 400 may have one or more processors 408 that use the same or a different processing technology. Additionally, processor 408 may be a separate component of system 400 or may be embedded within another component of system 400. Processor 408 may execute instructions that may be written using one or more programming languages, scripting languages, assembly languages, etc. The instructions may be carried out by, for example, a special purpose computer, logic circuits, or hardware circuits. The term "execute" is the process of running an application or the carrying out of the operation called for by an instruction. Processor 106 may process data and/or execute applications stored in memory 406, such as weather data 417 and weather image application 418 and/or other instructions.

Processor 408 may be included as part of a multi-scan, multi-tilt angle weather radar system and may perform the customary functions performed by a conventional weather radar return processing unit. Processor 408 may also perform several additional operations based upon the additional data and/or instructions provided in memory 406. In general, processor 408 may merge or cross qualify portions, or ranges, of the radar returns of several different antenna sweeps at several different tilt angles, so that a single, relatively clutter-free image may be presented to the pilot based upon the several separate scans. The radar returns may be processed by processor 408 to generate a 2-D, 3-D, or 4-D weather profile of the weather near the aircraft. In some embodiments, processor 408 may merge or cross qualify portions, or ranges, of the radar returns or weather data of several different sources, including weather data from one or more remote sources 414, so that a composite or fused image may be presented to the pilot based upon the several weather data sources.

Processor 408 may process weather radar returns to identify or sense the presence of weather conditions in front of (e.g., in the flight path) or in view of the aircraft. In some embodiments, processor 408 may utilize the altitude and range of the weather condition to generate a vertical profile associated with the weather. Processor 408 may scan across an array of azimuths to generate a 3-D weather profile of the weather near the aircraft, which may be stored for later presentation and/or displayed on display 410. In some embodiments, additional visual indicators other than the representation of weather are provided on display 410. In some embodiments, a range and bearing matrix having range markers indicating distance from a current location of the aircraft and bearing markers indicating azimuths from a current flight path or bearing of the aircraft may be provided and may assist the pilot in cognitive recognition of weather features from the pilot's perspective.

Referring now to FIG. 4B, a data flow diagram of exemplary weather radar system 400 is shown. As shown in FIG. 4B, processor 408 may provide a velocity parameter 420, such as a mean velocity parameter and a spectral width parameter 422 (e.g., derived from weather radar returns or from weather data from a remote source for individual or grouped weather cells). Alternatively, other types of velocity parameters can be utilized. In addition, processor 408 may provide a reflectivity parameter 424 and a range parameter 426. Range parameter 426 along with scan angle position may be used to plot the location of a weather condition on display 410. Processor 408 may also receive a temperature parameter 430, an azimuth 431, a location 432, a date 433, a time 434, and a flight plan 435 from another source, such as an external sensor or system. In some embodiments, parameters 430, 431, 432, 433, 434 and 435 may be computed by processor 408 using data stored in memory 406, such as radar return data 417a or remote source data 417b.

Weather data 417a from returns received by antenna 404 and weather data 417b from remote source 414 may be stored in memory 406. Weather data 417b from remote source 414 may be received via communications unit 416 (shown in FIG. 4A). Weather data 417 may, for example, be based on received horizontal and/or vertical radar scans and/or data from other sources 414 (e.g., NEXRAD weather data). Weather data 417 may also be from another weather radar source or data from an onboard weather radar system operating at a different frequency, such as a millimeter frequency, a Ka band frequency, a W band frequency, etc. In some embodiments, weather data 417 may be from a non-radar airborne source (a LIDAR source, an infrared source, etc.). Weather data 417 may include weather data as described with reference to FIG. 3 above. For example, weather data 417 may include a time of sensing data, such as a time stamp, and motion vector data (e.g., individual weather cell and average motion vector data) for temporal and spatial correlation (e.g., NEXRAD data received from remote source 414).

Referring again to FIG. 4A, memory 406 may store a weather imaging module 418 that may be executed by processor 408. Weather imaging module 418 may be, for example, one or more program modules including routines, programs, objects, components, data structures, etc. that perform particular tasks or implement particular data types. Weather imaging module 418 may be written using, for example, one or more programming languages, assembly languages, scripting languages, etc. According to an exemplary embodiment, weather imaging module 418 may be an organized set of instructions that, when executed, cause processor 408 to utilize weather data 417a from returns received by antenna 404 and/or weather data 417b received from remote source 414 stored in memory 406 to provide individual, composite, fused, or overlay image data indicative of a weather condition for display on display 410. The image data derived from weather data 417a and 417b may be spatially correlated by weather imaging module 418 using, for example, time of sensing information and motion vector values. In some embodiments, growth and decay information may be received, which may be used by weather imaging module 418 to increase or decrease the size, shape, and intensity of an image or other visual indication of a weather condition displayed in accordance with time. In some embodiments, weather imaging module 418 may determine a confidence factor reflecting the degree to which weather data 417 received from two or more sources agree in their characterization of the weather condition. In some embodiments, weather imaging module 418 may combine estimates of storm top height received from two or more sources of weather data 417 to provide image data indicative of the vertical extent of a weather condition.

Figure 5:
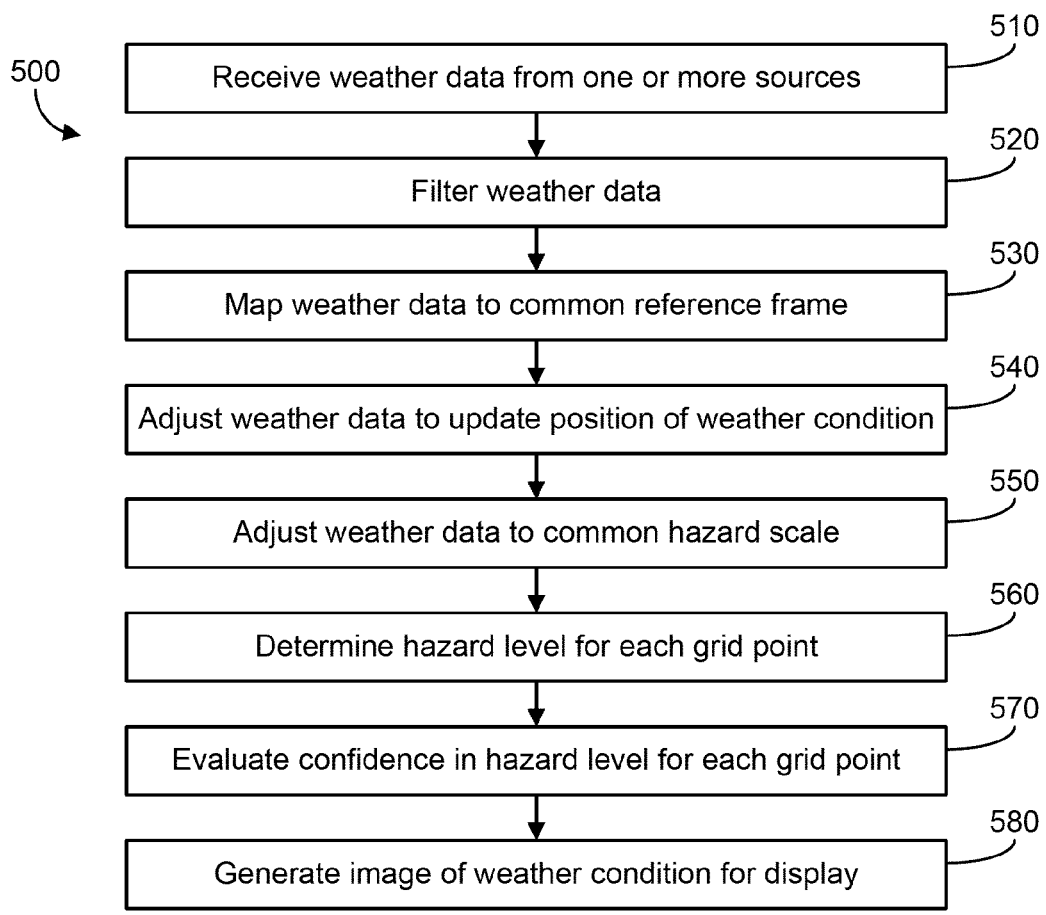
FIG. 5 is a flow diagram of an exemplary process for providing image data indicative of a weather condition.

Referring now to FIG. 5, a flow diagram of an exemplary process 500 for providing image data indicative of a weather condition is shown. Process 500 may be, for example, in the form of program instructions that may be executed by a processor included in a weather radar system, such as exemplary weather radar system 400 shown in FIGS. 4A and 4B. At a step 510, weather data may be received from one or more sources as described with reference to, for example, FIGS. 3, 4A, and 4B.

At a step 520, the weather data may be filtered. For example, weather data that is outdated or corrupted may be removed. In some embodiments, radar returns data or other weather data indicative of convective weather conditions may be removed if they are older than one update cycle. In some embodiments, lightning data provided as individual flash records may be managed such that flash density in a time window of interest may be determined, and flash records outside of the window of interest may be discarded.

In some embodiments, data outside of a defined spatial coverage area may be removed. For example, if NEXRAD data is to be combined with other data sources, data from the other sources falling outside of a defined spatial coverage for the NEXRAD data may be removed or may be assigned a lower level of confidence. In some embodiments, weather data within a certain range of the physical radar source may be rejected. For example, data within 35 kilometers of a radar source may typically be rejected where it may be assumed that the scan pattern results in inverted cones of silence in the radar returns data, when the volume coverage pattern and altitude of the weather condition indicates a concern. In some embodiments, data from one source may not be used if data from another source is deemed of better quality. For example, data from a radar station using a clear air volume coverage pattern may not be used if there is another station using a convective volume coverage for the same area, and convectivity is the primary focus.

At a step 530, weather data may be mapped to a common reference frame. In some embodiments, the received weather data may be mapped to a common gridded format using, for example, a 1 kilometer grid. Such a grid may provide a uniform structure in latitude and longitude to which one or more sets of weather data from one or more sources may be mapped. Other formats and grid spacings are contemplated as well, depending on required detail, available memory, and processing capabilities.

Figure 6:
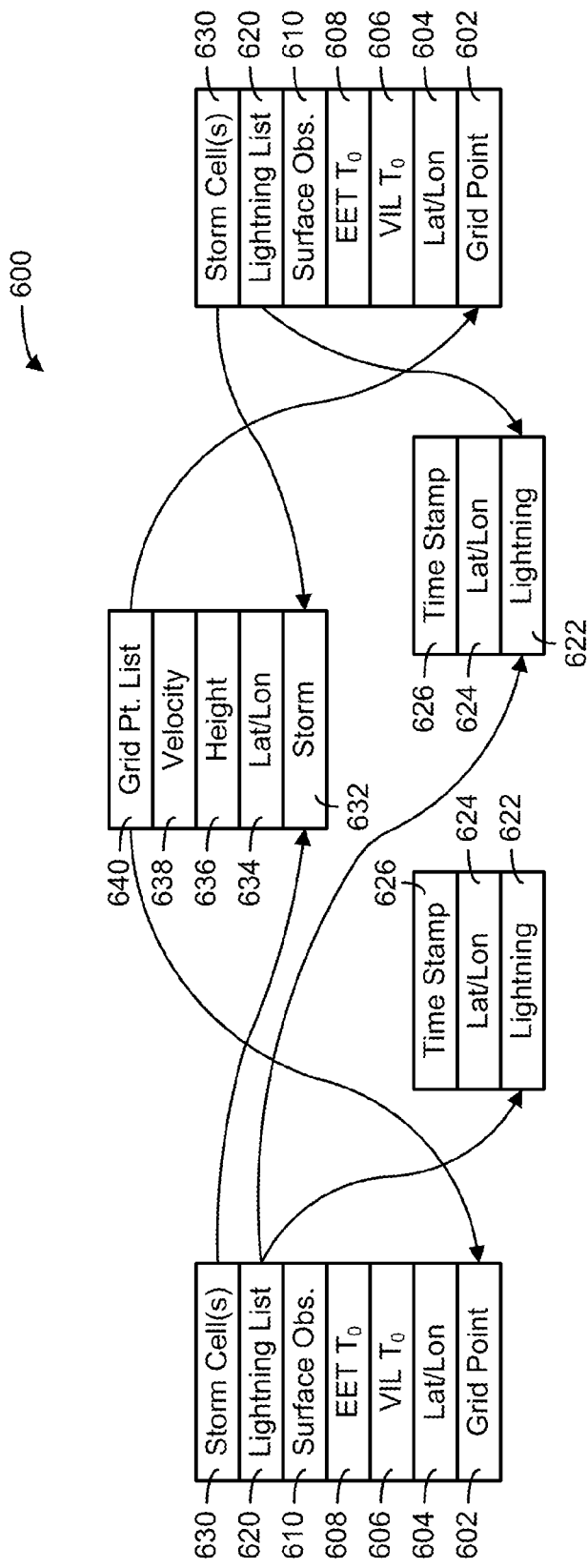
FIG. 6 is a diagram of an exemplary gridded weather data structure.

In some embodiments, weather data received in a non-gridded format (e.g., weather cell tracking data, lightning flash data, etc.) may be linked to the common gridded format. For example, referring now to FIG. 6, an exemplary gridded weather data structure 600 is shown. Structure 600 may include one or more grid points 602. Each grid point 602 may correspond to a grid point in a common gridded format. Each grid point 602 may include corresponding data from gridded weather data sources (e.g., NEXRAD data, etc.). For example, each grid point 602 may include a latitude and longitude identifier 604, as well as corresponding values such as a VIL value 606 and an EET value 608. Corresponding surface observations 610 may also be mapped to each grid point 602. Each grid point 602 may also include a pointer to a list 620 of data structures 622 for lightning strikes within a specified range of the grid point 602 (e.g., for use in lightning density calculations). Data included in each lightning strike data structure 622 may include, for example, a latitude and longitude identifier 624 and a time stamp 626. Each grid point 602 may also include a pointer to a list 630 of data structures 632 for one or more weather cells (e.g., a NEXRAD weather cell) in which the grid point 602 is included. Data included in each weather cell data structure 632 may include, for example, a latitude and longitude identifier 634, a storm height 636, a storm velocity or motion vector 638, and a list 640 of grid points 602 within a specified reflectivity range, as well as segment or polygon data describing the shape of the weather cell. Other examples of data that may be included in each weather cell data structure 632 may include a maximum registered height, a maximum VIL, indicators of hail presence, etc.

Referring again to FIG. 5, at a step 540 the weather data may be adjusted to update a location of a weather condition. For example, latencies or time delays associated with transmitting weather radar data may lead to inaccuracies or discrepancies in the apparent location of a weather condition in or among uplinked weather data. The uplinked weather data may be moved or advected in an appropriate distance and direction from a first location (e.g., grid point) to an updated second location based on data indicative of the movement of the weather condition. For example, weather data, such as NEXRAD data, containing location, time of sensing, and motion vector data for a weather condition may be received. The location of the weather condition may be advected by a distance equal to the speed of the weather condition multiplied by an amount of time elapsed since the time of sensing of the weather data in an appropriate direction indicated by the motion vector. Weather data from different weather data sources may be advected using the same motion vector for each gridded location irrespective of boundaries of an individual weather condition within each product. The weather data may also be advected to a future time, such as for strategic planning (e.g., based on forecasts from ground weather radar data compared with prediction from an aircraft weather radar system and forecasts from a satellite weather data source).

In some embodiments, the received weather data may include data indicative of a respective first location for each of a plurality of individual weather cells, which may or may not be segmented. The received weather data may further include a respective motion vector for each weather cell. Each respective motion vector may include data indicative of a speed and direction of travel for its corresponding weather cell, or for each grid location within a relevant region. For segmented weather cells, the respective motion vector for each cell may be used to advect the weather cell in an appropriate distance and direction from a first location to an updated second location. For gridded weather data, the respective motion vectors for each gridded location may be used to advect the weather condition to an updated second location for each grid point.

In some embodiments, an estimated motion vector may be determined for a grouping of the plurality of weather cells (e.g., based on an average, interpolation, a data quality analysis, etc.), and the estimated motion vector may be used to update the location of one or more of the weather cells in the grouping, the entire grouping, or weather cells outside the grouping (e.g., non-segmented cells, cells without motion vector or tracking data, cells exhibiting erratic motion with respect to surrounding cells, etc.). For example, a motion vector for the grouping of cells may be received from the weather data source (e.g., NEXRAD data or data from an aircraft weather radar system) or may be determined from a plurality of individual motion vectors by the weather radar system receiving the weather data (e.g., based on an average, interpolation, a data quality analysis, etc.). The estimated motion vector may be applied to one or more cells in the grouping, or to cells outside the grouping, such as an adjacent or nearby weather cell. In some embodiments where weather data from multiple sources is to be combined, fused or overlaid, the estimated motion vector may be calculated using data for one or more weather cells from a first one of the weather data sources and applied to weather cells from other data sources (e.g., weather cells that may not be correlated with weather cells in the weather data from the first source). In some embodiments, general atmospheric motion data from numerical analysis and forecasting may be used to provide a default motion vector. In some embodiments the estimated motion vector may be received from a nowcasting or forecasting weather product, such as CIWS. In some embodiments where weather data from multiple sources may be combined to estimate motion vectors for each grid location, a decision based on the quality of the weather data may be made. In some embodiments where weather data is not available for all grid locations, general atmospheric motion data from numerical analysis and forecasting may be used to provide a default motion vector for certain grid locations.

In some embodiments, uncertainty in the advection process may be reflected by adjusting the size of a weather condition indicator. For example, the size of a weather condition indicator may be increased in proportion with the distance that the weather condition may be advected. Similarly, the perimeter of a weather cell may be increased by a predetermined number of grid points or image pixels (e.g., one grid point or pixel) to account for changes such as growth or decay or a change in shape. In some embodiments, a weather data source may provide weather data including an estimate of possible errors in the tracking process for one or more weather cells, or an estimate of a change in size of the weather condition due to growth or decay. The error estimate or change estimate may be used to adjust the size of the weather condition indicator. In some embodiments, overlay images may be generated to indicate estimated error or growth and decay. In some embodiments, the size of a weather condition indicator may be increased or decreased according to the estimated error and/or growth or decay, and/or the severity level indicated by the weather condition indicator may be increased or decreased. In some embodiments, when divergent motion vectors will result in gaps in advected data, each gap may be evaluated based on the motion vectors of adjacent grid points. In some embodiments, multiple weather data sources having a common time and grid may be advected using a common motion vector.

In some situations, the received weather data may include one or more weather cells with motion vectors indicating motion significantly different from that of adjacent or nearby weather cells (e.g., due to collapse of a large weather cell generating a diverging pool of cold air that spawns new cells around its perimeter. In some embodiments, this may be addressed by analyzing the tracking history or determining a confidence estimate for any divergent weather cells. For divergent weather cells with a short tracking history (e.g., based on a minimum threshold of samples), an average motion vector for a grouping of surrounding or nearby cells may be calculated and used for advecting the divergent weather cell. For divergent weather cells with a sufficient number of samples, the motion vector for the weather cell may be used to advect the weather cell to an updated location. In some embodiments, both the average and actual motion vectors may be used to advect the divergent weather cell to two locations per the calculated distances for each motion vector, and an image of the divergent weather cell may be increased to cover both advected locations.

Figure 7:
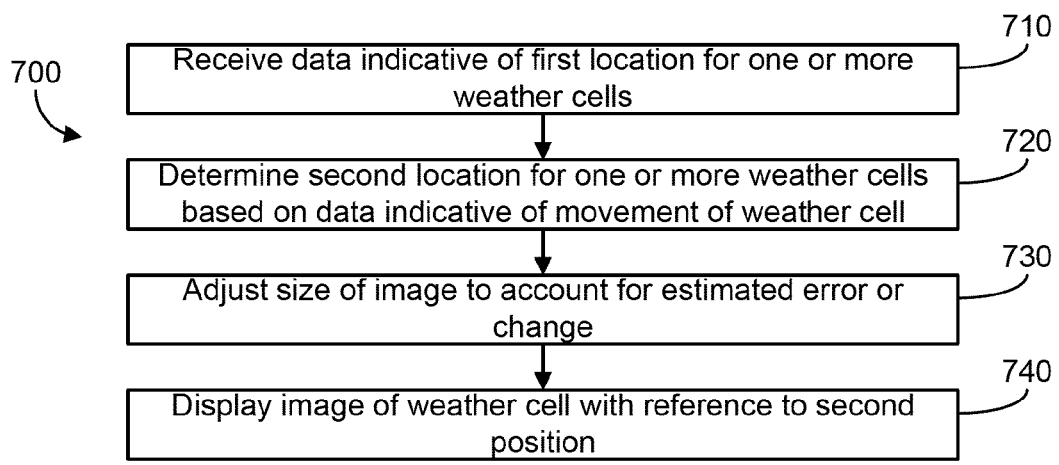
FIG. 7 is a flow diagram of an exemplary process for adjusting weather data to update a location of a weather condition.

Referring now to FIG. 7, an exemplary process for adjusting weather data to update a location of a weather condition is shown. At a step 710, weather data including data indicative of a first location for one or more weather cells associated with a weather condition may be received. At a step 720, a second location for one or more of the weather cells may be determined based on data indicative of movement of the weather cell. Data indicative of movement of the weather cell may include, for example, actual or average motion vectors received or calculated per one or more of the various embodiments described herein. At a step 730, the size of one or more images for the one or more weather cells may be adjusted to account for, for example, estimated errors or changes in size or shape for the weather cell. At a step 740, an image of the one or more weather cells may be displayed with reference to the second position according to one or more of the various embodiments described herein.

In some embodiments, weather data for a weather condition may be received from multiple unsynchronized sources (e.g., multiple NEXRAD radar installations). For example, an aircraft having an aircraft-based weather radar system and receiving weather data from a ground-based weather radar system may be moving from the radar coverage area of one ground-based system to another ground-based system. In such embodiments, the location of a weather condition may be advected using weather data from whichever data source provides the best tracking geometry. For example, the respective range of each of the weather data sources may be used to determine which source may provide the best source of data for advection (e.g., azimuth resolution may deteriorate with increasing distance, data near a data source may be limited due to a low maximum radar elevation range, etc.). In some embodiments, an estimated motion vector may be calculated using data from one or more or all of the available data sources within range of the weather condition. In some embodiments, multilateration may be applied to range data received from each of the weather data sources rather than using motion vector data in order to avoid azimuth resolution issues. In some embodiments, the volume coverage pattern, altitude, range, and age of the weather data for each weather data source may be used to estimate a number of radar slices or beams in order to determine the quality of the weather data from each source.

Figure 8:
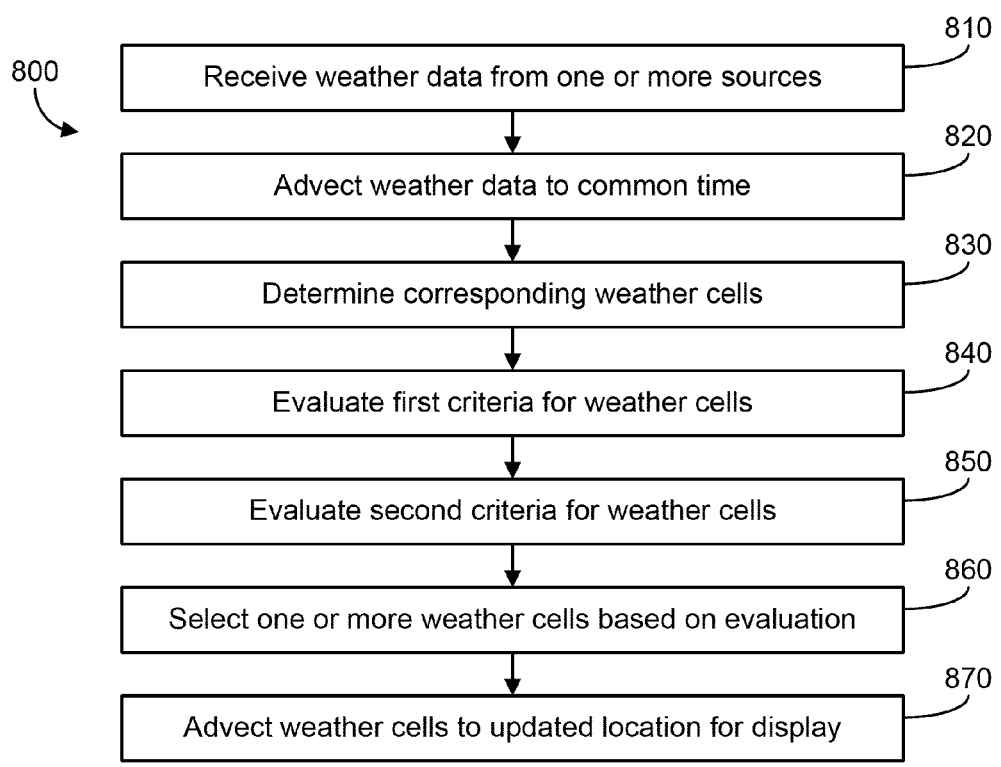
FIG. 8 is a flow diagram of an exemplary process for selecting among weather data sources in order to update a location of a weather condition.

Referring now to FIG. 8, an exemplary process 800 for selecting among weather data sources in order to update a location of a weather condition is shown. At a step 810, weather data indicative of a first location and other parameters for one or more weather cells associated with a weather condition may be received from one or more weather data sources. At a step 820, the location data for weather cells from each source may be advected to a common time (e.g., the time that the most recent radar volume scan was completed). At a step 830, the advected weather cell locations from each weather data source within a particular region of interest may be compared to determine correspondence. For example, in some embodiments, global weather cell locations may be created and assigned to all cells within a predetermined distance (e.g., a set number of nautical miles) of each other such that weather cells from each source within the predetermined distance from each other are assumed to be corresponding weather cells for purposes of evaluation.

A quality estimate may be determined for weather data from each weather data source. For example, at a step 840, a first criterion may be evaluated on a cell-by-cell basis for weather data received from each of the weather data sources for each corresponding cell. In some embodiments, the first criterion may be indicative of negative factors associated with the weather data for each corresponding weather cell from each data source. According to an exemplary embodiment, these factors may include, but are not limited to one or more of the following: (a) absence of tracking data; (b) data aged beyond a predetermined limit (e.g., 15 minutes); (c) direction data received without a speed value; (d) the difference between a minimum acceptable number of elevation scans (e.g., five beams) and the number of scans that fall below 40,000 feet of the cell location; (e) tracking error estimates provided by the data source (e.g., NEXRAD error estimates); (f) absence of forecast data; (g) absence of cell structure data; and (h) data outside of a maximum allowable distance range for the weather data source. Appropriate weights may be applied to each factor. The value of the first criterion for each corresponding cell from each weather data source may be compared with a threshold value, and cell data from a source with a value of the first criterion greater than the threshold value may be discarded. If no weather data from any weather data source for a particular cell falls below the threshold value, then the weather cell from the source having the lowest value may be selected for further evaluation. If weather data for one or more corresponding weather cells falls below the threshold, then each of these weather cells may be selected for further evaluation.

At a step 850, a second criterion may be evaluated on a cell-by-cell basis for corresponding weather cells from each weather data source selected for further evaluation. In some embodiments, the second criterion may be indicative of positive factors associated with the data for each corresponding weather cell from each data source. According to an exemplary embodiment, more highly weighted factors may include, but are not limited to, one or more of the following: (a) the number of forecast values provided (e.g., for NEXRAD data, the number of 15, 30, 45, and 60 minute forecasts received, with higher weighting assigned to the 15 and 30 minute forecasts); (b) the estimated number of beams in the volume scan pattern that fall below a particular aircraft altitude (e.g., 40,000 feet) at the range of the cell multiplied by a weighting factor; and (c) volume scan patterns used under differing ambient conditions (e.g., a higher value may be assigned to a higher number of scans and a higher sweep rate used by NEXRAD for convective weather, and a lower value to a lower number of scans or a lower scan rate used by NEXRAD in stratiform rain, clear air, or winter modes). In some embodiments, lower weighted factors may include: (d) freshness of data (e.g., decremented by the difference between the current time and the time of sensing, with a linear decrement from no decrement for fresh data to a score of zero for data of the maximum allowable age (e.g., 15 minutes)); (e) forecast motion accuracy, with a decreasing value as the error approaches a maximum acceptable error (e.g., 5 nautical miles); (f) VIL for each cell; and (g) maximum radar reflectivity for each cell. Appropriate weights may be applied to each factor. The value of the weighted sum of these factors for each corresponding cell may be used to select the data source for each weather cell having the highest value.

At a step 860, one or more of the weather cells evaluated in steps 840 and 850 may be selected as providing the best weather data based on the evaluation. For example, a composite set of motion vector data may be generated using the data for each weather cell selected based on the evaluations in steps 840 and 850. At a step 870 each weather cell may be advected to an updated location for display. In some embodiments, if no weather cell from any weather data source for a particular cell is found acceptable, then a motion vector (e.g., an average motion vector, a motion vector based on a quality estimate, etc.) may be calculated from a grouping of adjacent or nearby cells and used to advect that particular cell.

In some situations, weather data received from a weather data source may include one or more weather cells without motion vector or tracking data. In some embodiments, a motion vector based on all other cells having motion vector data may be used as described above, provided that the region of interest represented by the weather cell does not exhibit strong rotation (e.g., in the presence of a strong low-pressure area). In some embodiments, a more accurate estimate may be achieved by calculating the motion vector based on adjacent or nearby cells as described above. In some embodiments, the motion vector may be based on weather model information (e.g., High Resolution Rapid Refresh, Weather Research and Forecasting, etc.).

Figure 9:
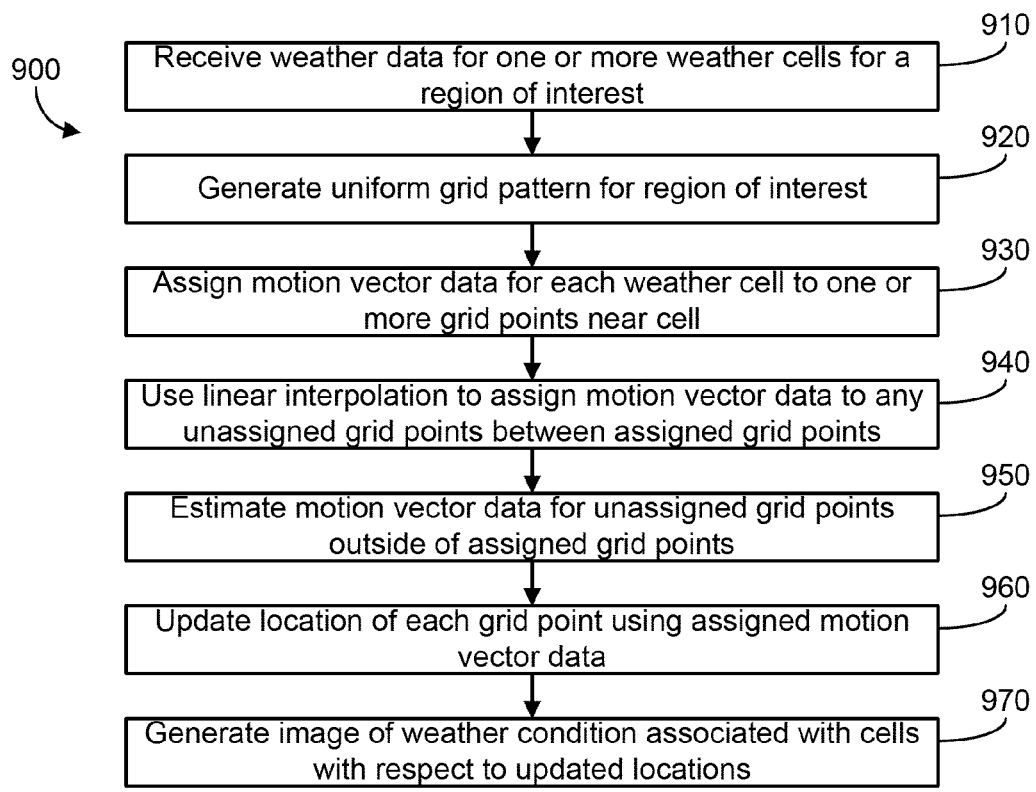
FIG. 9 is a flow diagram of an exemplary process for updating the location of weather cells not having motion vector or tracking data.

Referring now to FIG. 9, an exemplary process 900 for updating the location of weather cells not having motion vector or tracking data is shown. At step 910, weather data indicative of a first location and other parameters, such as motion vector data, for one or more weather cells associated with a weather condition in a region of interest may be received from one or more weather data sources. At a step 920, a uniform grid pattern may be generated for the region of interest. For example, the region of interest may be divided into squares 1 kilometer to a side. At a step 930, motion vector data for each respective weather cell may be assigned to one or more grid points near the weather cell. At a step 940, linear interpolation may be used to assign motion vector data to any unassigned grid points between grid points having assigned motion vector data. At a step 950, motion vector data may be estimated for any unassigned grid points outside of grid points having assigned motion vector data. In some embodiments, linear extrapolation may be used to provide the estimate. In some embodiments, an average motion vector for the assigned grid points may be used to provide the estimate. In some embodiments, a least squares fit of a 2-D polynomial function based on the assigned grid points may be used to provide the estimate. Using a least squares fit may provide the advantage of smoothing over erratic weather cell motion. In some embodiments, weather data derived from radiosonde data, weather models (e.g., High Resolution Rapid Refresh, Weather Research and Forecasting, etc.), or from NEXRAD Storm Tracking may be used. At a step 960, the location of each grid point may be updated using the assigned motion vector data. At a step 970, an image of a weather condition associated with the weather cells may be generated with respect to the updated location for each weather cell.

Referring again to FIG. 5, at a step 550, the weather data may be adjusted to a common hazard scale. In some embodiments, weather data received from a remote weather data source may be translated to the scale used by the receiving weather radar system. In some embodiments, the weather data may be translated according to the Federal Aviation Administration (FAA) VIP hazard scale. Referring to FIG. 10, an exemplary translation chart 1000 of selected parameters to the VIP hazard scale is shown. An exemplary approach to estimating VIL from airborne weather radar reflectivity measurements is described in U.S. patent application Ser. No. 14/086,844 filed on Nov. 21, 2013 by Breiholz et al., entitled "Weather Radar System and Method for Estimating Vertically Integrated Liquid Content," assigned to the assignee of the present application and incorporated herein by reference in its entirety.

Referring again to FIG. 5, at a step 560, a hazard level may be determined for each grid point. In some embodiments, a VIP value may be assigned to each grid point. Factors in assigning each VIP value may include, for example, radar reflectivity and VIL values received from one or more weather data sources. In some embodiments, composite reflectivity may be substituted where VIL is not available, or may be used to supplement VIL in situations where composite reflectivity may be updated more frequently. In some embodiments, a maximum VIP value may be assigned to each grid point where it is the maximum value available from all weather data sources for each particular grid point. In some embodiments, a maximum VIP may be assigned at each grid point provided that each value is logically consistent. For example, maximum VIP values of 2 or less may not need to be checked for consistency. Higher VIP values may be deemed consistent if weather data from other weather data sources or adjacent grid points is one VIP level below the maximum or higher as may be consistent with the continuous nature of convective activity, e.g., high threat values may not exist in isolation with no surrounding detectable weather. In some embodiments, a confidence level associated with each particular weather data source may be used to determine which source to use to assign the VIP value to a particular grid point, such that the VIP value with the highest confidence is used. In some embodiments, the VIP value may be assigned based in part on one or more applicable guidelines. Guidelines may include, for example, regulations (e.g., RTCA DO-340 guidelines establishing a particular weather data source for a given flight scenario, planning horizon, other rules and regulations, etc.). In some embodiments, a VIP value may be assigned based on guidelines for a particular flight scenario (e.g., en-route, descent, departure, etc.) and/or if a particular grid point is within a particular planning horizon or distance from the aircraft (e.g., less than 3 minutes, 3-20 minutes, more than 20 minutes, etc.). In some embodiments, guidelines may include guidelines for particular weather data sources that may be relevant for a given flight scenario and/or planning horizon (e.g., observations, nowcasts and/or forecasts from Airborne Weather Sensors, CoSPA, NEXRAD, SIGMETS, Graphical Turbulence Guidance, etc.), and a particular weather data source may be selected based on, for example, the weather data source indicating the maximum VIP value for a particular grid point. In some embodiments, the VIP value may be based on guidelines setting priorities for flight scenarios and/or the expected risk of encountering specific atmospheric threats during that flight scenario or phase of flight. In some embodiments, a VIP value may be assigned to a particular grid point based on an average of two or more sensors or weather data sources. In some embodiments, a confidence value for a selected VIP value may be used to adjust one or more final VIP values (e.g., a low confidence VIP value may be increased to a higher VIP value, a high VIP value with a low confidence value may be used to increase adjacent VIP values to allow a wider berth, etc.).

In some embodiments, lightning data received from one or more weather data sources may be factored in the assignment of each VIP value. As shown in FIG. 10, the mapping of lightning rate to VIP is based on an observation window of 10 minutes within an 8 kilometer radius of each grid point. In some embodiments, this radius may be larger than grid spacing such that a given lightning strike may contribute to the lightning rate at multiple grid points. The exemplary mapping of lightning strike density to VIP shown in FIG. 10 is based on the National Weather Association National Convective Weather Forecast algorithm. In some embodiments, the observation window and/or radius may be adjusted to prevent the lighting factor from dominating the assignment of VIP values. In some embodiments, data from an aircraft-based lightning detector may be included, provided that range estimates from the lightning detector are checked for consistency with, for example, weather radar data for nearby weather cells.

A VIP value or other hazard level may also be applied to other weather data, such as observations, nowcasts, and/or forecasts of turbulence, icing, High Altitude Ice Water Content areas, volcanic ash, etc. In some embodiments, inferred hail data received from one or more weather data sources may be factored in the assignment of each VIP value. For example, given that hail is indicative of severe weather (e.g., a VIP value of 3 or higher), indication of the presence of hail may be evidence that a weather cell is hazardous. In some embodiments, NEXRAD inferred hail data using multiple elevation angles and referenced to the freezing and −20° C. levels may be used. Similarly, inferred lightning data (e.g., from an aircraft-based weather radar system) may be factored into the assignment of each VIP value. In some embodiments, VIP threat information for turbulence may be used (e.g., Graphical Turbulence Guidance data, aircraft-based radar data). In some embodiments, icing data from in-situ icing detectors (e.g., own-ship or other aircraft) or weather data sources may be used. Volcanic ash information may come from, for example, an infrared detection system (e.g., own-ship, another aircraft, etc.) or derived from satellite weather data sources. In some embodiments, consistency of each VIP level or value may be cross-checked with a received echo top height measurement from one or more weather data sources, given that heavy stratiform rain systems may have heavy rainfall, but lack the high storm top altitudes associated with severe convective weather systems.

In some embodiments, sounding data received from one or more weather radar data sources may be factored into the assignment of each VIP value. Sounding data may generally provide profiles of temperature, dew point, and wind speed and direction as a function of altitude, and may provide insight into the likelihood and severity of convective weather. For example, the region between freezing and −20° C. may provide the highest radar reflectivity due to the increased likelihood of liquid coated hail in this region. The tropopause height may generally indicate how high air will continue to rise during convection. Exemplary indices derived from sounding data that may be indicative of convective weather may include Convective Available Potential Energy (CAPE) and Convective Inhibition (CIN). High CAPE may indicate the likelihood of intense storms. High CIN may indicate that a greater atmospheric disturbance will be required to initiate convective weather, but also that if convection does occur, it may be more intense.

In some embodiments, data from an aircraft-based weather radar system, such as ambient temperature, altitude, air pressure, and wind direction and speed may be factored into the assignment of VIP values. In some embodiments, this data may be used in conjunction with sounding data, analyses, or forecasts to adjust estimated atmospheric profiles based on, for example, 12-hour soundings to the current time to provide improved estimates of parameters such as freezing level or tropopause height. In some embodiments, weather data for a predetermined distance below the altitude of the aircraft, (e.g., 10,000 feet), may be suppressed as being less hazardous to the aircraft.

In some embodiments, other parameters may be factored into the assignment of each VIP value. For example, in some embodiments, reported surface data may be used in conjunction with aircraft-based air data measurements to estimate current atmospheric temperature profiles. In some embodiments, satellite-derived weather data may be used, including, for example, images formed at multiple visible and infrared wavelengths. These images may be used individually or combined together with other weather data for specific purposes targeted at convective activity such as cloud cover, cloud top temperature (from which cloud top height may be inferred), and convective initiation. A determination of cloud cover may be useful in removing spurious data from weather data. In some embodiments, the cloud cover image may be used as a mask, which may be advected to compensate for latency, and used to mask out weather radar returns from cloudless areas. Such returns may be due to flocks of birds or insects or to atmospheric anomalies or solar interference. In some embodiments, cloud top height derived from the measured temperature of the clouds referenced to the atmospheric temperature profile derived from soundings may be used in lieu of or in addition to radar cloud top data to gauge the severity of storms and to determine their relevance to aircraft flying at high altitudes. In some embodiments, convective initiation may be used as an early indicator of convective activity and as a source of information about convection beyond the range of airborne weather radar in parts of the world where ground radar data may not be available.

Referring again to FIG. 5, at a step 570, a confidence level may be evaluated for the hazard level determined for each grid point. The confidence level may be a value that increases with the number of weather data sources in agreement for a given grid point. In some embodiments the confidence level may be based on weather data for each specific grid point. In some embodiments, the confidence level may be based on weather data within a region of interest surrounding a particular grid point. According to an exemplary embodiment, a confidence level for each grid point may be evaluated using weather data within two grid points of the particular grid point being evaluated, such that a 5×5 matrix of grid squares centered about the particular grid point being evaluated are examined.

According to an exemplary embodiment, an acceptable match between weather data sources may be defined by any value greater than two less than the value of the data being evaluated at a particular grid point. Under this acceptable match definition, surrounding values higher than the value of the data being evaluated at a particular grid point are always counted as support. In some embodiments, more complex variations on both the region of interest and the acceptable match definition may be implemented by, for example, assigning lower weights to more distant matches or defining fuzzy logic membership functions around the data being evaluated at a particular grid point.

A confidence level of 1.0 may be output for a particular grid point if an acceptable match exists for a certain number or percentage of surrounding weather data values (e.g., 40%). For example, if three weather data sources are used with a region of interest of a 5×5 matrix of grid squares centered about the particular grid point being evaluated, there are three 5×5 matrices of weather data values (75 total values). The center point of one of these matrices contributes the value of the data being evaluated (e.g., a VIP value), leaving 74 values that may support the value of the data being evaluated. If the acceptable match percentage is set at 40%, then 30 of these values must meet the acceptable match definition (e.g., 30 values that are greater than two less than the value of the data being evaluated at a particular grid point) in order to achieve a confidence level of 1.0.

A curve may be defined to set the confidence level for cases where fewer than the required number or percentage of surrounding weather data values (e.g., 40%) support the value of the weather data being evaluated. In some embodiments, a linear curve may be used. In some embodiments, an exponential curve may be used. For example, where the required percentage of surrounding weather data values is 40%, an exemplary exponential rise may be defined by $C=10^{(Count)}/10^{(0.40)}$ where C is the confidence level and Count is the percentage of surrounding weather data values that support the value of the weather data being evaluated.

In some embodiments, the various weather data sources may be weighted according to their reliability at a given grid point. For example, an aircraft-based weather radar may be weighted more heavily than other weather data sources within a certain range of the aircraft (e.g., 80 nautical miles) due to a faster update rate, but may be weighted lower than other weather data sources at greater ranges where it may be subject to beam spreading, shadowing, or ground clutter.

Referring again to FIG. 5, at a step 580, an image of a weather condition may be generated for display. Images may be displayed using one or more colors (e.g., red, yellow, and green) to indicate areas of respective precipitation rates, and black to indicate areas of very little or no precipitation. Each color may be associated with a radar reflectivity range which corresponds to a respective precipitation rate range. For example, red may indicate the highest rates of precipitation while green may indicate the lowest (non-zero) rates of precipitation. Certain displays may also utilize a magenta color to indicate regions of turbulence. In some embodiments, images may be displayed using outlines, cross-hatching, uniformly organized speckles, etc. The outlines, cross-hatching and/or speckles may use color (e.g., to indicate precipitation rate). The images may be bounded (e.g., outlined) or unbounded and may have a variety of shape profiles including rounded and straight edges.

In some embodiments, the images may provide an indication of the confidence levels determined at step 570. For example, in some embodiments, a separate image is generated for purposes of portraying confidence values. In some embodiments, the color saturation or brightness of a portion of an image may be reduced to indicate regions of lower confidence. In some embodiments, a cross-hatch pattern may be used to distinguish regions of lower confidence, depending on the capabilities of the display.

Some ground-based weather data sources, such as NEXRAD, provide echo top height data in addition to identifying individual weather cells and determining cell height and VIL for each. Similarly, some aircraft-based weather radar systems may perform vertical sweeps through areas of high reflectivity to provide estimates of echo top height. In some embodiments, asynchronous ground-based and aircraft-based echo top height data may be fused to adjust older, but more detailed ground based data.

Figures 11A, 11B, 11C, 11D, 11E, 11F:
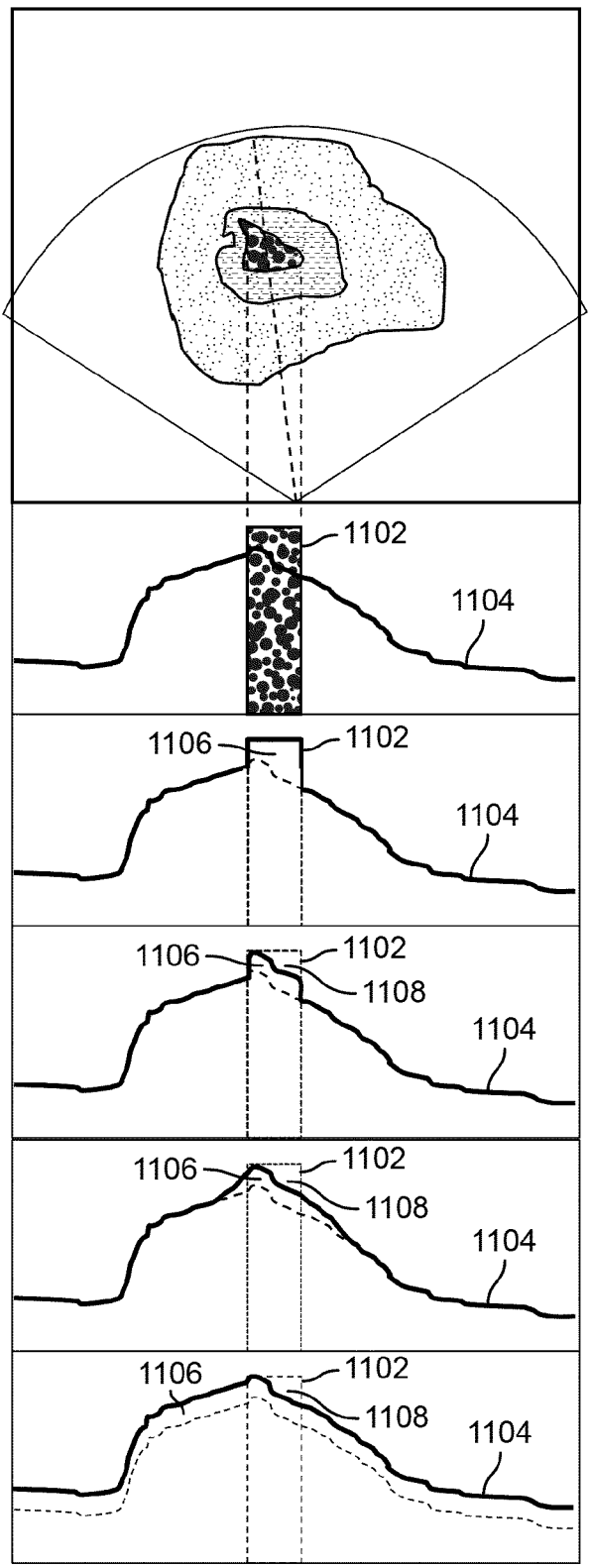
FIGS. 11A-11F are diagrams illustrating exemplary approaches to fusion of echo top height data.

Referring now to FIGS. 11A-11F, exemplary approaches to fusion of echo top height data are shown. FIG. 11A shows an exemplary echo top image 1100 from an aircraft-based weather system with the vertical measurement indicated at 1102. FIG. 11B shows a 2-D rendering of ground-based echo tops data 1104 with the aircraft-based vertical measurement 1102 overlaid. FIG. 11C shows an exemplary approach to echo top fusion wherein the top of curve 1104 is raised to match the height indicated by the aircraft-based vertical measurement 1102. FIG. 11D illustrates another exemplary approach to echo top fusion wherein the shape of curve 1104 is retained but raised so that its peak matches the height indicated by the aircraft-based vertical measurement 1102. FIG. 11E illustrates another exemplary approach to echo top fusion wherein the offset of curve 1104 as shown in FIG. 11D is gradually reduced to smooth the transition moving away from the region corresponding to the height indicated by the aircraft-based vertical measurement 1102. FIG. 11F illustrates another exemplary approach to echo top fusion wherein the entire curve 1104 is raised to match the height indicated by the aircraft-based vertical measurement 1102. The approach illustrated in FIG. 11F may be modified to use linear interpolation where multiple top measurements exist that are not uniformly offset. In each of FIGS. 11B-11F, a region 1106 indicates the increased safety margin due to updating the ground based estimate with the aircraft-based measurement, and a region 1108 indicates additional airspace identified as safe with respect to the aircraft-based measurement alone. In some embodiments, the approaches illustrated in FIGS. 11B-11F may be applied where the aircraft-based echo top height measurement is lower than the ground-based echo top height measurement. In some embodiments, lowering the height is only permitted if there is a well-defined lowering of the height exhibited over multiple samples.

In some embodiments, the fused echo top data may be displayed as a separate color-coded relief map. In some embodiments, estimated tops of individual cells may be indicated as numerical tags on a display, such as a reflectivity/VIL VIP display. In some embodiments, a 3-D display may be generated to represent an individual polygon for each grid point. In some embodiments, data more than a predetermined threshold distance (e.g., 10,000 feet) below the aircraft may be suppressed or otherwise visually indicated.

The embodiments in the present disclosure have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A method of displaying an image representative of a weather condition near an aircraft, the method comprising:
    receiving weather data representative of the weather condition from a plurality of weather data sources, the weather data including location data for the weather condition;
    mapping the weather data received from each source to a common locational reference frame based on the location data;
    adjusting the weather data received from each source to a common hazard scale;
    determining a hazard level associated with the weather condition for a reference point in the reference frame based on the adjusted weather data for each source; and
    displaying the image representative of the weather condition near the aircraft based on the hazard level for the reference point;
    wherein adjusting the weather data comprises adjusting a portion of the weather data received from a first source of the plurality of weather data sources based on a characteristic of the weather condition indicated by the weather data received from a second source of the plurality of weather data sources, and adjusting the weather data by retaining the shape of a curve defined by the portion of the weather data received from the first source.

2. The method of claim 1, further comprising adjusting the weather data from one of the weather data sources to update a location of the weather condition within the reference frame.

3. The method of claim 2, wherein the weather data from the one of the sources includes a motion vector, the method further comprising adjusting the weather data to update the location based on the motion vector.

4. The method of claim 1, further comprising evaluating a confidence level for the hazard level at the reference point.

5. The method of claim 4, wherein the confidence level is based on weather data within a region of interest surrounding the reference point.

6. The method of claim 1, further comprising filtering the weather data received from each weather data source.

7. The method of claim 6, wherein the weather data received from each weather data source is filtered based on one of a time of sensing, a range of the weather condition from the weather data source from which the respective weather data is received, and a defined spatial coverage area for at least one of the weather data sources.

8. The method of claim 1, wherein the common locational reference frame is a gridded reference frame including a plurality of grid points.

9. The method of claim 8, wherein weather data received in a non-gridded format is linked to the gridded reference frame using a gridded weather data structure.

10. The method of claim 9, wherein the non-gridded weather data includes one of weather cell tracking data and lightning flash data.

11. The method of claim 1, wherein adjusting the weather data received from each source to a common hazard scale includes adjusting one of rainfall rate data, reflectivity data, and vertically integrated liquid.

12. The method of claim 1, wherein the hazard level is determined based on one of turbulence data, reflectivity data, vertically integrated liquid data and lighting data.

13. The method of claim 1, wherein determining the hazard level associated with the weather condition for the reference point in the reference frame includes at least one of determining a maximum hazard value available for the reference point from each weather data source, selecting one of the weather data sources based on a confidence level for each weather data source, and selecting one of the weather data sources based in part on one or more applicable guidelines.

14. An aircraft weather radar system, comprising:
a processor; and
a non-transitory memory coupled to the processor and containing program instructions that, when executed, cause the processor to
receive weather data representative of a weather condition from a plurality of weather data sources, the weather data including location data for the weather condition;
map the weather data received from each source to a common locational reference frame based on the location data;
determine a hazard level associated with the weather condition for a reference point in the reference frame based on the adjusted weather data for each source;
evaluate a confidence level for the hazard level at the reference point; and
display an image representative of the weather condition near the aircraft based on the confidence level for the hazard level at the reference point;
wherein the program instructions are configured to cause the processor to adjust the weather data by retaining a shape of the weather condition defined by a portion of the weather data received from a first source of the plurality of weather data sources based on a characteristic indicated by the weather data received from a second source of the plurality of weather data sources.

15. The system of claim 14, wherein the program instructions are further configured to cause the processor to adjust the weather data received from each source to a common hazard scale.

16. The system of claim 14, wherein the program instructions are further configured to cause the processor to evaluate the confidence level based on weather data within a region of interest surrounding the reference point.

17. The system of claim 14, wherein the program instructions are further configured to cause the processor to evaluate the confidence level using an exponential function.

18. A weather radar system, comprising:
a processor; and
a non-transitory memory coupled to the processor and containing program instructions that, when executed, cause the processor to
receive echo top data for a weather condition from first and second weather data sources;
map the echo top data to a common reference frame;
adjust the echo top data received from the first source based on the echo top data received from the second source; and
generate an image representative of the weather condition based on the adjusted echo top data;
wherein the program instructions are configured to cause the processor to adjust the echo top data by increasing values of a portion of the echo top data received from the first source based on a height of the weather condition indicated by the echo top data received from the second source;
wherein the program instructions are configured to cause the processor to adjust the echo top data by retaining the shape of a curve defined by the portion of the echo top data received from the first source in the adjusted data.

19. The system of claim 18, wherein the received echo top data is received in a non-gridded format, and wherein the common reference frame has a common gridded format.

20. The method of claim 19, wherein the common gridded format comprises a plurality of grid points, each grid point corresponding to a latitude and longitude identifier, and wherein a surface observation is mapped to each grid point.

* * * * *